(12) United States Patent
Lee et al.

(10) Patent No.: US 7,588,346 B2
(45) Date of Patent: Sep. 15, 2009

(54) LAMP ASSEMBLY, LIGHT SUPPLYING APPARATUS AND LIQUID CRYSTAL DISPLAY DEVICE USING THE SAME

(75) Inventors: Hea-Chun Lee, Suwon-si (KR); Sang-Soo Kim, Seoul-si (KR); Jin-Ho Ha, Suwon-si (KR); Yoon-Soo Kwon, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 10/632,082

(22) Filed: Jul. 30, 2003

(65) Prior Publication Data

US 2004/0027049 A1 Feb. 12, 2004

(30) Foreign Application Priority Data

Aug. 9, 2002 (KR) ............... 2002-47252

(51) Int. Cl.
*F21S 4/00* (2006.01)
(52) U.S. Cl. ............. 362/225; 362/219; 362/221; 362/260; 439/56; 439/235
(58) Field of Classification Search ............ 362/26, 362/31, 219, 221, 217–225, 296, 260, 646; 349/58, 70–71; 439/56, 235
See application file for complete search history.

(56) References Cited

U.S. PATENT DOCUMENTS

| | | | | |
|---|---|---|---|---|
| 4,504,891 A | * | 3/1985 | Mazis | 362/219 |
| 5,114,372 A | * | 5/1992 | Fuchs | 445/3 |
| 5,138,528 A | * | 8/1992 | Altman et al. | 361/760 |
| 5,349,508 A | * | 9/1994 | Karbaf | 362/217 |
| 5,720,546 A | * | 2/1998 | Correll et al. | 362/221 |
| 5,907,218 A | * | 5/1999 | Altman et al. | 315/56 |
| 5,908,235 A | * | 6/1999 | Petrozello et al. | 362/260 |
| 6,050,704 A | * | 4/2000 | Park | 362/260 |
| 6,079,851 A | * | 6/2000 | Altman et al. | 362/260 |
| 6,217,190 B1 | * | 4/2001 | Altman et al. | 362/221 |
| 6,218,782 B1 | * | 4/2001 | Mallalieu | 315/56 |
| 6,441,874 B1 | * | 8/2002 | Saito et al. | 349/70 |

(Continued)

FOREIGN PATENT DOCUMENTS

JP 03179485 A 8/1991

(Continued)

*Primary Examiner*—Sandra L O'Shea
*Assistant Examiner*—Jason Moon Han
(74) *Attorney, Agent, or Firm*—Cantor Colburn LLP

(57) ABSTRACT

A lamp assembly, light supplying module and LCD device using the same are provided. The LCD device includes the light-supplying module for generating a first light, a light distribution-changing module for receiving the first light and changing the optical characteristics of the first light to output a second light, and a display module for receiving the second light having improved optical characteristics, the light distribution-changing module being coupled to the light-supplying module by means of a first engaging member, the display module being coupled in the light distribution-changing module by means of a second engaging member, and the display module, light distribution-changing module and light-supplying module being coupled to each other by means of a third engaging member. Therefore, each component of the LCD device having above structure is easily separated, replaced and easily repaired.

20 Claims, 24 Drawing Sheets

U.S. PATENT DOCUMENTS

| | | | |
|---|---|---|---|
| 6,459,203 B1 * | 10/2002 | Kim | 315/56 |
| 6,667,780 B2 * | 12/2003 | Cho | 349/58 |
| 7,057,678 B2 * | 6/2006 | Ishida et al. | 349/58 |
| 2002/0149713 A1 * | 10/2002 | Ishida et al. | 349/58 |

FOREIGN PATENT DOCUMENTS

| | | |
|---|---|---|
| JP | 05119311 A | 5/1993 |
| JP | 08094845 | 4/1996 |
| JP | 08129989 | 5/1996 |
| JP | 2001043715 | 2/2001 |
| JP | 2002-132193 A * | 5/2002 |
| JP | 2003178718 A | 6/2003 |

* cited by examiner

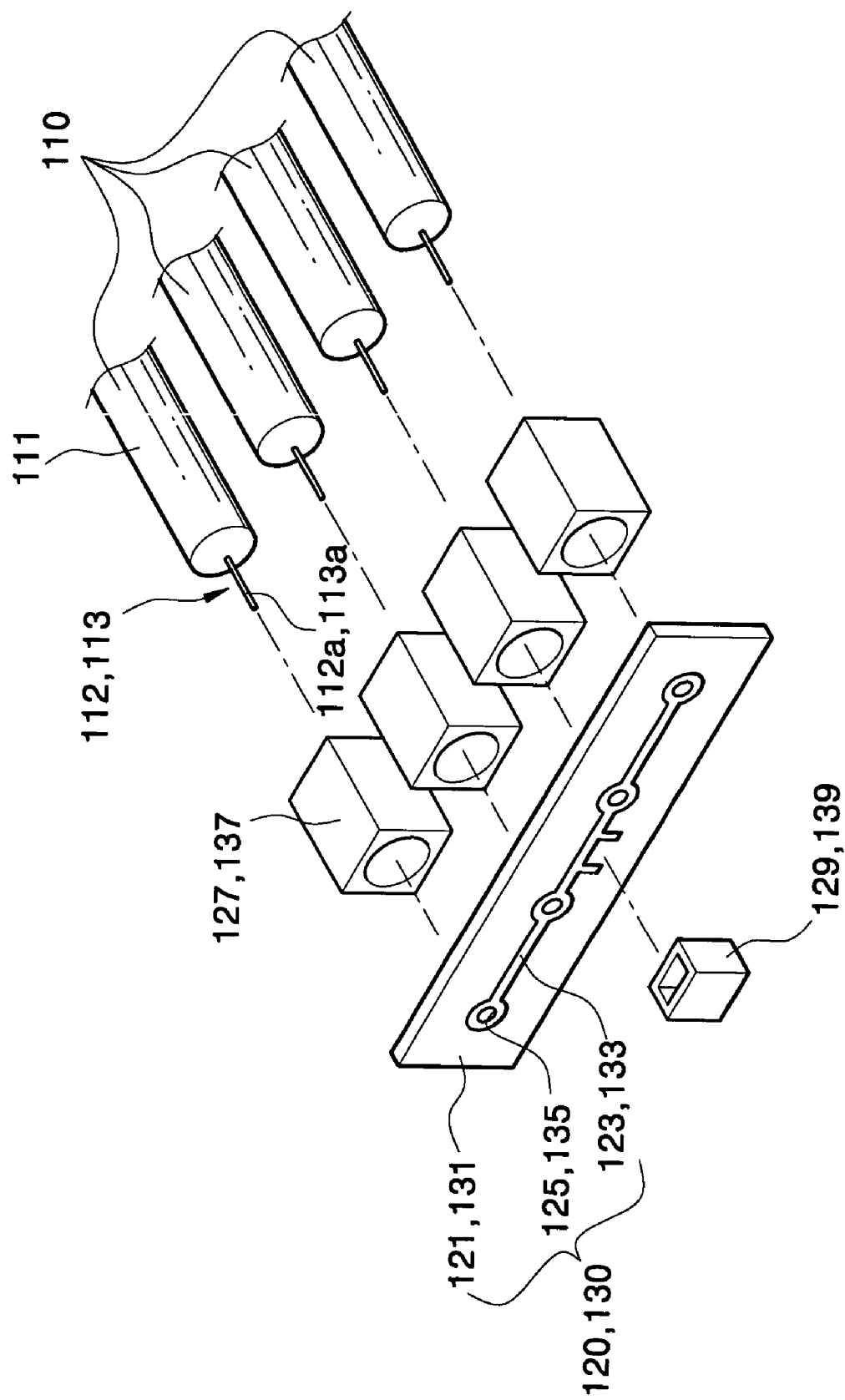

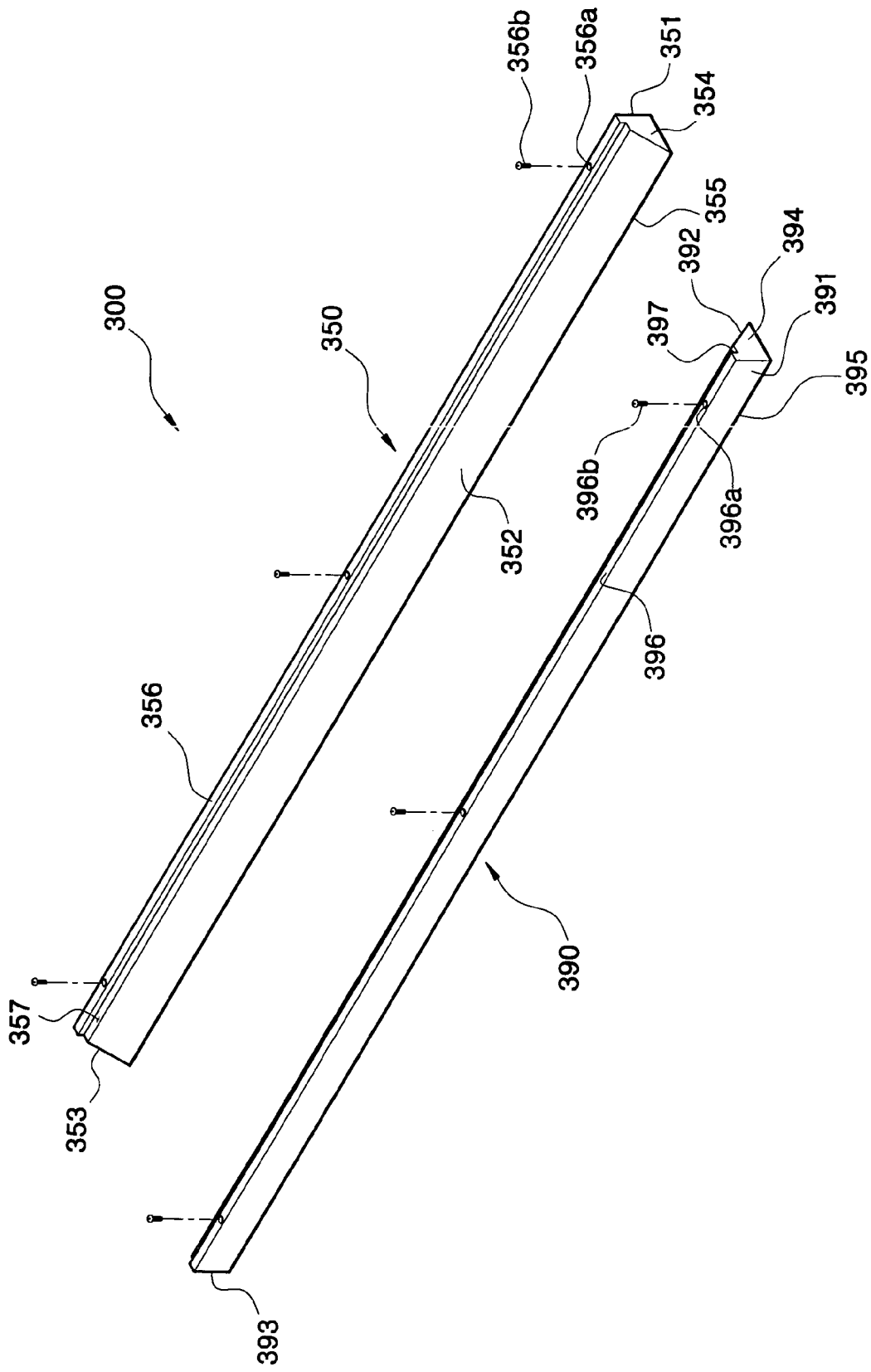

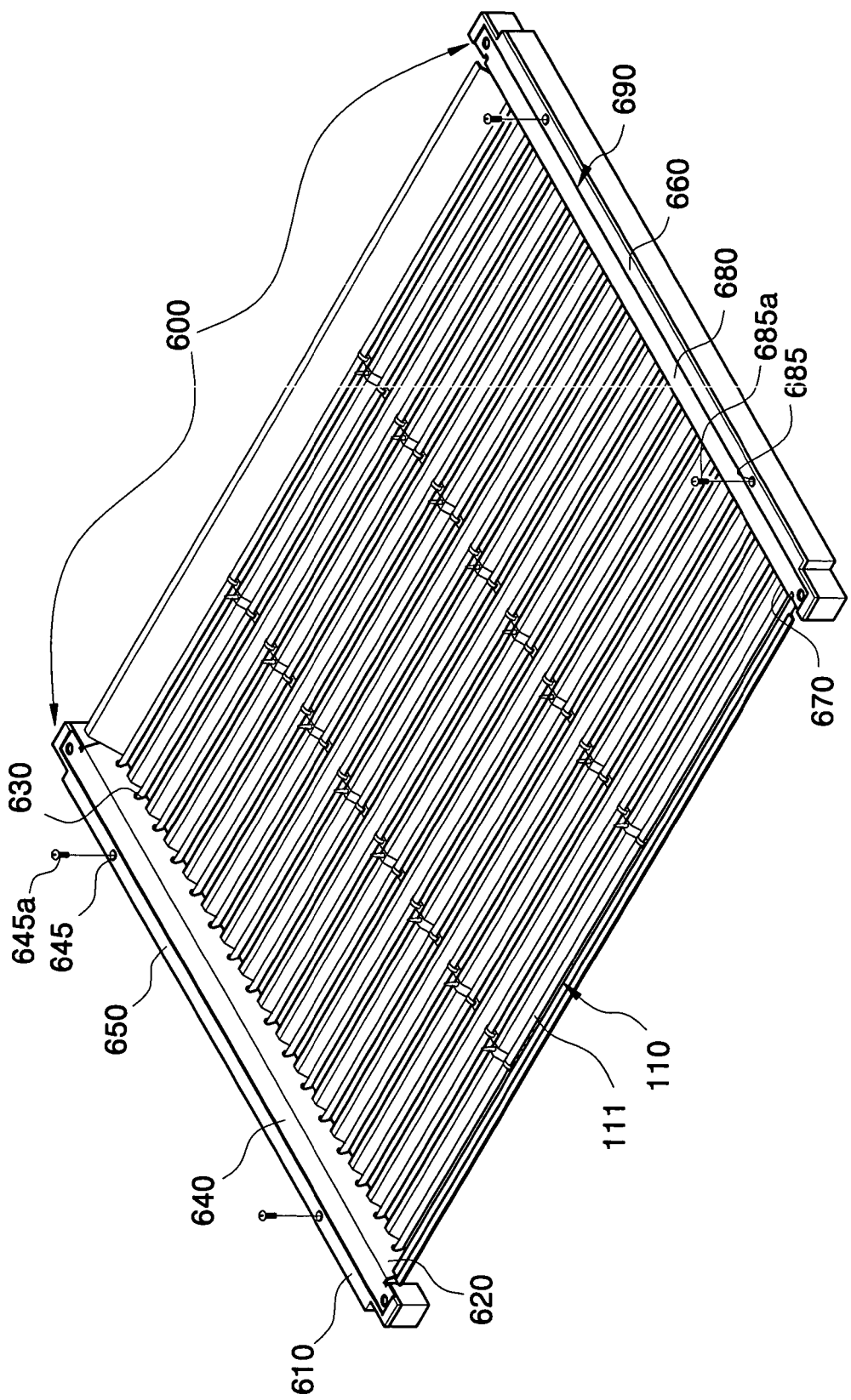

LAMP ASSEMBLY, LIGHT SUPPLYING APPARATUS AND LIQUID CRYSTAL DISPLAY DEVICE USING THE SAME

BACKGROUND OF THE INVENTION

1. Field of the Invention

The disclosure relates to a lamp assembly, a light supplying apparatus and a liquid crystal display device using the same.

2. Description of the Related Art

Liquid crystal display (LCD) devices are display devices that display images by means of liquid crystal.

Since the LCD devices have smaller dimension, lighter weight, and better display quality compared with other display devices, the LCD devices are widely used as display devices for information processing devices.

The liquid crystal of the LCD devices does not generate lights, but adjusts transmissivity of light. Accordingly, the LCD devices require a light source so as to display images.

The LCD devices may use an external light so as to display images. However, the LCD devices using the external light are not able to display images in a place where the external light is not provided, for example, in a dark environment. The recent LCD devices employ lamp(s) for generating lights so as to display images in a place where the external light is not provided.

The lamps used for the LCD devices require a long life expectancy and generate a small amount of light. Cold cathode ray fluorescent lamps (CCFLs) satisfy such requirements, and are employed as a light source in the LCD devices.

However, the CCFLs may not be used eternally, and should be replaced by new CCFLs after used for a certain period, for example, about 10,000 hours to 100,000 hours. Further, the CCFLs have a fatal effect on the display quality of the LCD devices, especially in the LCD devices having a large screen, when the CCFLs almost reach the life expectancy. The reason is that the LCD devices having the large screen use much more CCFLs than the LCD devices having a small screen.

Furthermore, since the CCFLs are arranged inside the LCD devices, the LCD devices should be disassembled into their components to replace old CCFLs that reach the life expectancy with new CCFLs and then assembled to be used. It is not easy to replace the old CCFLs with the new CCFLs.

Recently, the LCD devices have been developed to have a screen size of more than 30 or 40 inches.

The number of components of the LCD devices having a large screen is much more than that of the LCD devices having a small screen. Accordingly, the LCD devices employing the CCFLs require lots of efforts and increased time for replacement of the CCFLs.

Therefore, a need exits for LCD devices capable of easily replacing consumable components such as lamps and reducing the time taken for replacing old CCFLs with new CCFLs.

BRIEF SUMMARY OF THE INVENTION

Accordingly, the present invention provides a lamp assembly in which the number of components of the lamp assembly is minimized, an assembling process is simplified and lamps are easily replaced.

The present invention provides a light supplying apparatus having a lamp assembly in which the number of components of the LCD device is minimized, an assembling process is simplified and lamps are easily replaced.

The present invention provides a liquid crystal display device in which lamps are replaced by a simplified disassembling process, and a liquid crystal display panel and an optical sheet are not stained with fingerprint and contaminants during the disassembling process.

According to one aspect of the invention, there is provided a lamp assembly comprising: at least two lamps, each of the lamps including: a lamp body including a fluorescent layer formed on an inner surface of the lamp body and a discharge gas disposed in the lamp body; a first electrode for providing the lamp body with a first discharge voltage; and a second electrode for providing the lamp body with a second discharge voltage; and a first board, coupled to the first electrode, for providing the first electrode with the first discharge voltage.

According to another aspect of the invention, there is provided a light supplying apparatus comprising: a receiving container including a bottom face, a first side wall, a second side wall facing the first side wall, a third sidewall and a fourth sidewall facing the third side wall, each of the sidewalls being extended from an edge of the bottom face to form a receiving space; first and second lamp assembly-fixing members disposed on the bottom face of the receiving container, the first lamp assembly-fixing member being adjacent to the first sidewall, the second lamp assembly-fixing member being adjacent to the second sidewall, the first and second lamp assembly-fixing members having a bar shape, first recess and second recesses being formed on upper faces of the first and second lamp assembly-fixing members, and the upper faces being opposite to the bottom face of the receiving container; a reflection member partially inserted into a slot of the first and second lamp assembly-fixing members being opposite to the bottom face of the receiving container; a lamp assembly, including: first and second boards, the first and the second boards being inserted into the first and the second recesses of the first and second lamp assembly-fixing members, respectively; and a lamp having first and second electrodes, the first and second electrodes being connected with the first and second boards, respectively; and first and second insulated members for covering the first and second lamp assembly-fixing members, respectively, and for insulating the first and second boards.

According to further aspect of the invention there is provided a liquid crystal display device comprising: a light supplying member, including: a lamp assembly for generating a first light; and a receiving container having a bottom face for receiving the lamp assembly, and a plurality of sidewalls; a light distribution-changing member, including: an optical sheet for changing optical distribution of the first light to produce a second light; a first optical sheet-fixing member for receiving an edge of a bottom face of the optical sheet; a second optical sheet-fixing member having first and second faces, the first face pressing an edge of an upper face of the optical sheet, and the second face being bent to be connected one of the sidewalls of the receiving container; and a first engaging member for engaging the first optical sheet-fixing member with the second optical sheet-fixing member; a second engaging member for engaging one of the sidewalls of the receiving container with the second face of the second optical sheet-fixing member; a display unit, including: a liquid crystal display panel, disposed on the first face of the second optical sheet-fixing member to be opposite to the optical sheet, for changing the second light into a third light having image information; and a fixing member for fixing the liquid crystal display panel, the fixing member having a third face and a fourth face, the third face pressing an edge of the liquid crystal display panel, and the fourth face being bent to be connected to one of the sidewalls of the receiving container; a third engaging member for engaging the first face of the second optical sheet-fixing member with the third face of the fixing member; and a fourth engaging member for engaging one of the sidewalls of the receiving container, with the second face of the second optical sheet-fixing member and the fourth face of the fixing member.

According to the present invention, the liquid crystal display device may be disassembled into each module (component), such as a display module, a light distribution-changing module and a light-supplying module. Thus each expendable component, such as a lamp assembly, may be easily replaced with new component by a simplified disassembling process.

Therefore, the time required for disassembling the components of the liquid crystal display device may be remarkably reduced. In addition, the number of components may be remarkably reduced, to thereby remarkably reduce a manufacturing cost.

The liquid crystal display device according to the present invention may be useful for a television having a large screen.

BRIEF DESCRIPTION OF THE DRAWINGS

The above and other advantages of the present invention will become more apparent by describing in detail exemplary embodiments thereof with reference to the accompanying drawings, in which:

FIG. 3 is an exploded perspective view showing a first board, a second board and lamps of FIG. 1;

FIG. 4B is a perspective view showing the optical sheet-fixing block of FIG. 4A;

FIG. 8 is a perspective view showing an assembled structure of an insulated frame, the reflection plate, the lamp assembly-fixing block, and the light assembly according to the second exemplary embodiment of the present invention;

DETAILED DESCRIPTION OF PREFERRED EMBODIMENTS

Figure 1:
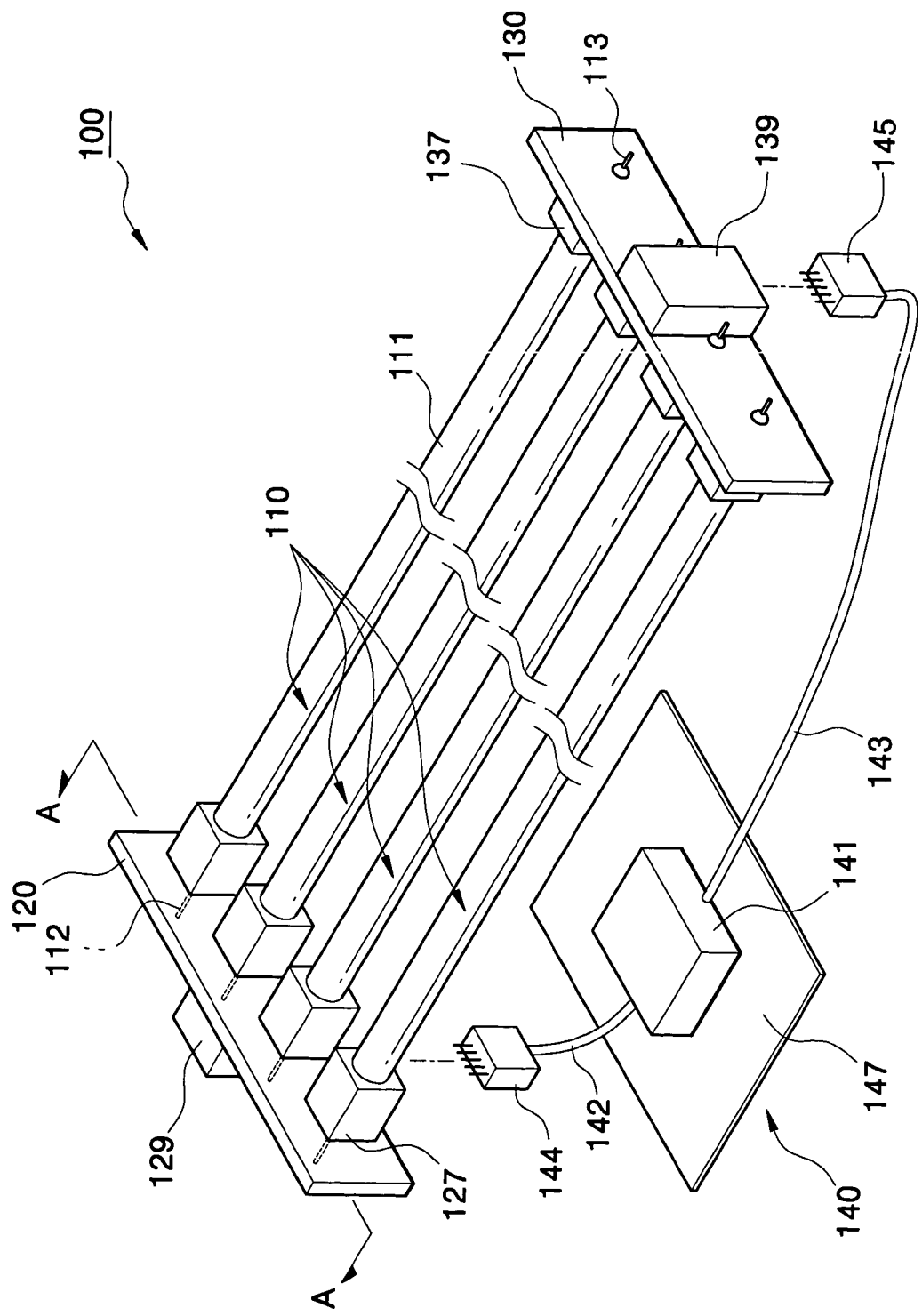
FIG. 1 is a perspective view showing a lamp assembly according to a first exemplary embodiment of the present invention.

FIG. 1 is a perspective view showing a lamp assembly according to a first exemplary embodiment of the present invention.

Referring to FIG. 1, a lamp assembly 100 includes a first board 120 and a second board 130. An inverter module 140 may be included in the lamp assembly 100.

At least two lamps 110 are used in the lamp assembly 100, and each of the lamps 100 is arranged in parallel each other.

Each of the lamps 110 has a lamp body 111, a first electrode 112 and a second electrode 113.

Figure 2:
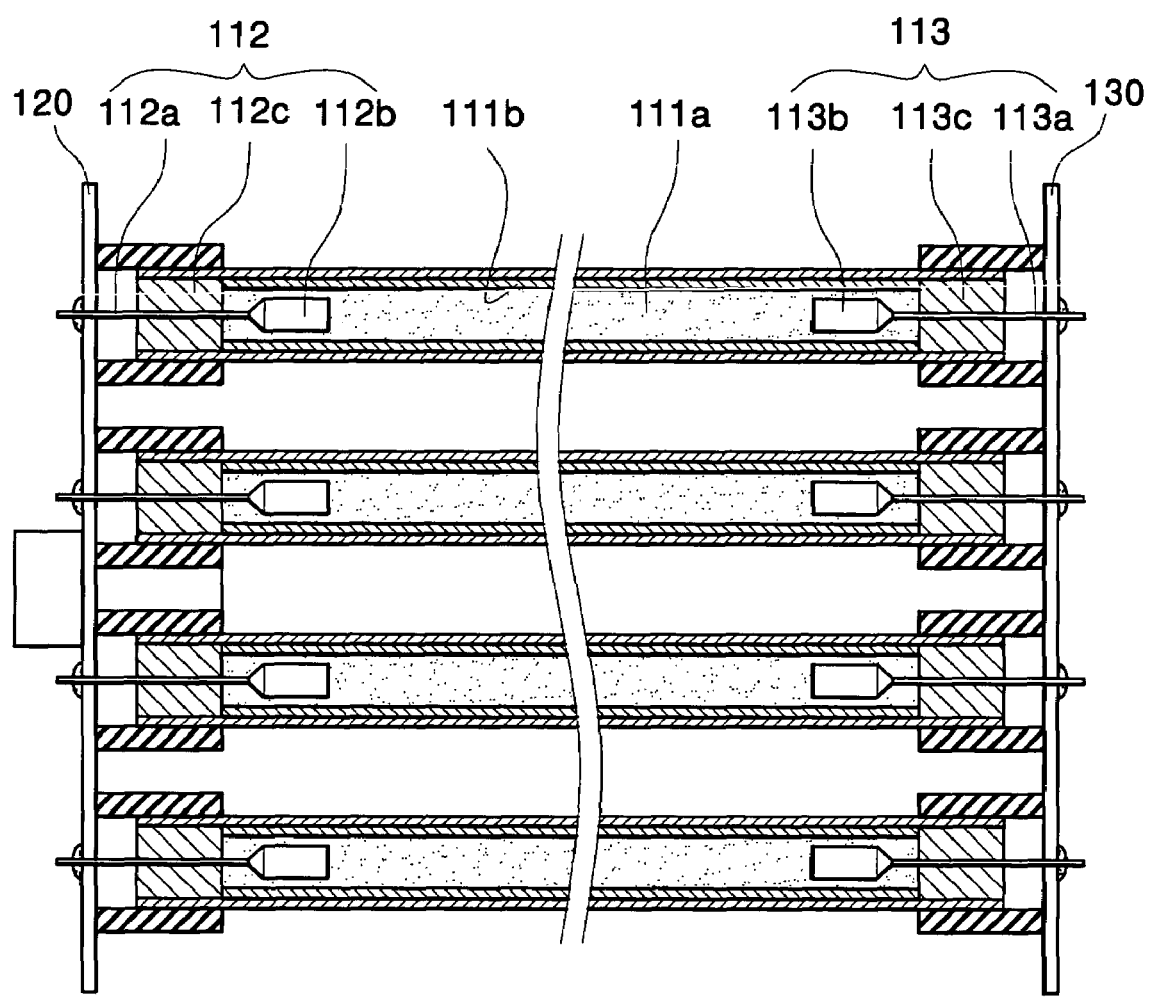
FIG. 2 is a cross-sectional view taken along A-A of FIG. 1.

FIG. 2 is a cross-sectional view taken along A-A of FIG. 1.

Referring to FIG. 1 and FIG. 2, the lamp body 111 is comprised of material having high transmissivity of light, and has a tube shape. Both ends of the lamp body 111 are opened.

The lamp body 111 includes a discharge gas 111a and a fluorescent layer 111b.

The discharge gas 111a is injected into the lamp body 111 by a predetermined pressure. The discharge gas 111a is dissociated into atoms, neutrons and electrons through an electric discharging process.

Fluorescent material is coated on an inner surface of the lamp body 111 to form the fluorescent layer 111b. The fluorescent layer 111b is activated by the electrons to generate a visible ray.

The first electrode 112 and the second electrode 113 cause electric discharge to dissociate the discharge gas in the lamp body 111.

The first electrode 112 includes a first lead line 112a, a first electrode body 112b and a first sealing glass 112c.

The first lead line 112a is comprised of nickel or copper, and has a shape of rod.

The first sealing glass 112c has a cylinder shape to be tightly inserted in the inner surface of the lamp body 111. The first sealing glass 112c has a through-hole, and the first lead line 112a is inserted in the first sealing glass 112c through the through-hole.

The first electrode body 112b is formed at one end of the first lead line 112a of the lamp body 111. The first electrode body 112b is comprised of conductive material, such as nickel or copper, and has a cylinder shape so as to easily release electrons. A first discharge voltage is applied to the first lead line 112a.

The first electrode 112 may be an internal electrode, or an external electrode where the first electrode 112 is disposed on an outside of the lamp body 111.

The second electrode 113 includes a second lead line 113a, a second electrode body 113b and a second sealing glass 113c.

The second lead line 113a is comprised of nickel or copper, and has a shape of rod.

The second sealing glass 113c has a cylinder shape to be tightly inserted in the inner surface of the lamp body 111. The second sealing glass 113c has a through-hole, and the second lead line 113a is inserted in the second sealing glass 113c through the through-hole.

The second electrode body 113b is formed on one end of the second lead line 113a of the lamp body 111. The second electrode body 113b comprises conductive material, such as nickel or copper, and has a cylinder shape so as to easily release electrons. A second discharge voltage is applied to the second lead line 113a.

The second electrode 113 may be an internal electrode, or an external electrode where the second electrode 113 is disposed outside of the lamp body 111.

The first discharge voltage applied to the first electrode 112 is different from the second discharge voltage applied to the second electrode 113.

Specifically, the voltage difference between the first and second discharge voltages is large enough to cause electric discharge.

The first board 120 and the second board 130 apply the first and second discharge voltages to the first and second lead lines 112a and 113a of the first and second electrodes 112 and 113 so as to simultaneously turn on the lamps 110.

FIG. 3 is an exploded perspective view showing a first board, a second board and lamps of FIG. 1.

Referring to FIG. 3, the first (or second) board 120 (or 130) includes a first (or second) board body 121 (or 131), at least one first (or second) conductive pattern 123 (or 133), at least two first (or second) through-holes 125 (or 135), at least two first (or second) lamp holders 127 (or 137) and a first (or second) connector 129 (or 139).

Preferably, the first board body 121 includes a printed circuit board. The first conductive pattern 123 is formed on the first board body 121. A length of the first conductive pattern 123 is longer than a distance between the first electrodes of adjacent lamps.

Each of the first through-holes 125 is formed in the first conductive pattern 123. Each of the first through-holes 125 is formed at a portion of the first conductive pattern 123, to which the first electrode 112 is contacted. The number of the through-holes 125 is at least the number of the lamps 110. For example, the first board body 121 may have, for example, four first through-holes 125.

The first (or second) electrode 112 (or 113), one of the first (or second) through-holes 125 (or 135) and the fist (or second) conductive pattern 123 (or 135) may be electrically connected each other by a soldering or a clip.

The first lamp holders 127 are comprised of rubber, and have an inner surface of a cylinder shape and an external surface of a cubic shape. An outer surface of the lamp body 111 is inserted into the inner surface of the first lamp holders 127. One end of the first lamp holders 127 is attached to the first board body 121.

The first (or second) lead line 112a (or 113a) maintains a gap of about 1 mm with the first (or second board body) 121 (or 131) by the first (or second) lamp holders 127 (or 137). The first (or second) lamp holder 127 (or 137) protects the first (or second) lead line 112a (or 113a) from an external impact or vibration.

The first (or second) connector 129 (or 139) is connected to the first (or second) conductive pattern 123 (or 133). The inverter module 140 is connected to the first connector 129 and the second connector 139.

Referring again to FIG. 1, the inverter module 140 includes an inverter 141, a first line 142 for applying the first discharge voltage to the first electrode 112, a second line 143 for applying the second discharge voltage to the second electrode 113, a first terminal 144, a second terminal 145 and an inverter control board 147.

The inverter 141 generates and applies the first and second discharge voltages to the first and second lines 142 and 143. The first and second lines 142 and 143 apply the first and second discharge voltages to the first and second electrodes 112 and 113, through the first and second terminals 144 and 145 and the first and second connectors 129 and 139 connected to the first and second terminals 144 and 145, respectively.

The inverter control board 147 controls the inverter 141. Specifically, the inverter control board 147 controls the timing for applying the first and second discharge voltages to the first and second electrodes 112 and 113, and the amplitude of the first and second discharge voltages.

In a second exemplary embodiment of the present invention, a light-supplying apparatus using the lamp assembly of the first embodiment is explained.

Figure 4A:
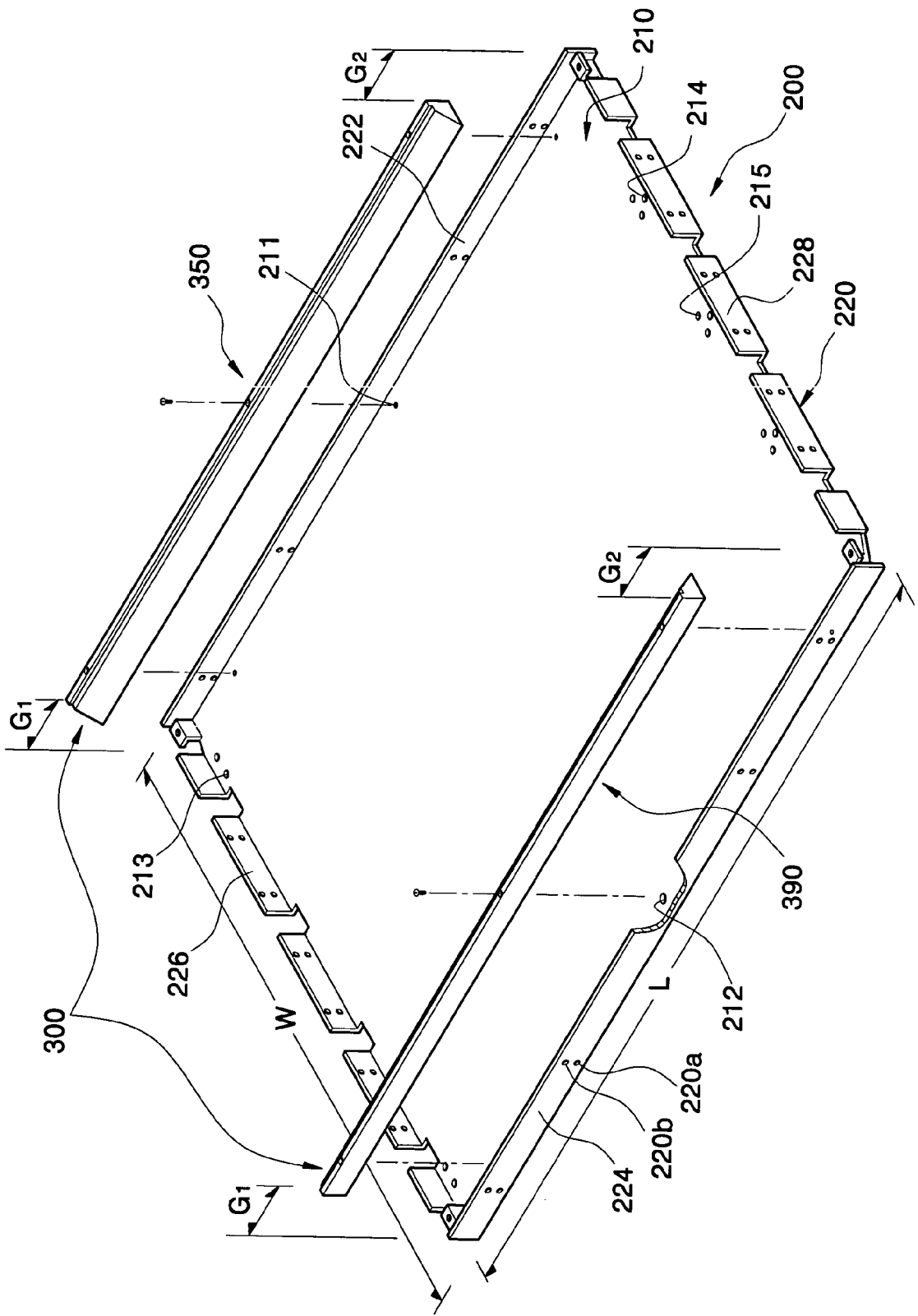
FIG. 4A is an exploded perspective view showing a bottom chassis and an optical sheet-fixing block of a light-supplying module according to a second exemplary embodiment of the present invention.

FIG. 4A is an exploded perspective view showing a bottom chassis and an optical sheet-fixing block of a light-supplying module according to a second exemplary embodiment of the present invention. FIG. 4B is a perspective view showing the optical sheet-fixing block according to the second exemplary embodiment of the present invention.

Referring to FIG. 4A, a bottom chassis 200 includes a bottom face 210 and a plurality of sidewalls 220, and is comprised of metal having a strong intensity.

The bottom face 210 may have a rectangular shape in which a length (L) is longer than a width (W), and has four bottom edges.

Each sidewall of the sidewalls 220 is extended to one direction from each of the bottom edges, to thereby form a receiving space.

The sidewalls 220 include a first sidewall 222, a second sidewall 224, a third sidewall 226 and a fourth sidewall 228. The first sidewall 222 and the second sidewall 224 have the length (L), and face each other. The third sidewall 226 and the fourth sidewall 228 have the width (W), and face each other.

The bottom face 210 has a plurality of first engaging holes 211. The first engaging holes 211 are formed along a line on a portion of the bottom face 210, which is apart from a first edge on which the first sidewall 222 and the bottom face 210 meet.

The bottom face 210 has a plurality of second engaging holes 212. The second engaging holes 212 are formed straight on a portion of the bottom face 210, which is apart from a second edge on which the second sidewall 224 and the bottom face 210 meet.

The bottom face 210 has a plurality of fifth engaging holes 213. The fifth engaging holes 213 are formed straight on a portion of the bottom face 210, which is apart from a third edge on which the third sidewall 226 and the bottom face 210 meet.

The bottom face 210 has a plurality of sixth engaging holes 214. The sixth engaging holes 214 are formed straight on a portion of the bottom face 210, which is apart from a fourth edge on which the fourth sidewall 228 and the bottom face 210 meet.

The bottom face 210 also has a plurality of seventh engaging holes 215 for fixing the inverter control board 147 (in FIG. 1). The seventh engaging holes 215 are formed in front of the sixth engaging holes 214 on the bottom face 210.

The reference numeral 220a represents a plurality of eighth engaging holes that is formed on a lower portion of the first, second, third and fourth sidewalls 222, 224, 226, 228 to be coupled with an optical sheet-fixing chassis. The reference numeral 220b represents a plurality of ninth engaging holes that is formed on an upper portion of the first, second, third and fourth sidewalls 222, 224, 226, 228 to be coupled with an LCD panel-fixing chassis.

Referring to FIG. 4A and FIG. 4B, an optical sheet-fixing block 300 includes a first optical sheet-fixing block 350 and a second optical sheet-fixing block 390.

Each of the first optical sheet-fixing block 350 and the second optical sheet-fixing block 390 has a bar shape with a slant side face.

Referring to FIG. 4A, the first optical sheet-fixing block 350 is disposed parallel to the first edge formed by the bottom face 210 and the first sidewall 222.

Referring to FIG. 4B, the first optical sheet-fixing block 350 includes a first side surface 351, a second side surface 352, a third side surface 353, a fourth side surface 354, a first bottom surface 355 contacting the bottom face 210 of the bottom chassis 220, a first upper surface 356 opposite the first bottom surface 355, and a first stepped portion 357.

The first side surface 351 contacts tightly to the first sidewall 222. The second side surface 352 is inclined and faces the first side surface 351.

The third side surface 353 faces the third sidewall 226 of the bottom chassis 200, and the fourth side surface 354 faces the fourth sidewall 228 of the bottom chassis 200.

The third side surface 353 maintains a first gap (G1) with the third sidewall 226 of the bottom chassis 200, and the fourth side surface 354 maintains a second gap (G2) with the fourth sidewall 228 of the bottom chassis 200.

A first stepped portion 357 is formed parallel to a fifth edge formed by the first upper surface 356 and the second side surface 352.

As shown in FIGS. 4A and 4B, third engaging holes 356a are formed on the first upper surface 356 so as to fix the first optical sheet-fixing block 350 to the bottom chassis 200. First screws 356b are inserted into the corresponding third engaging holes 356a, and are inserted into the corresponding first engaging holes 211 of the bottom chassis 200.

Referring again to FIG. 4A, the second optical sheet-fixing block 390 is disposed parallel to the second edge formed by the bottom face 210 and the second sidewall 224.

Referring again to FIG. 4B, the second optical sheet-fixing block 390 includes a fifth side surface 391, a sixth side surface 392, a seventh side surface 393, an eighth side surface 394, a second bottom surface 395 contacting the bottom face 210 of the bottom chassis 220, a second upper surface 396 facing the second bottom surface 395, and a second stepped portion 397.

The fifth side surface 391 contacts tightly to the second sidewall 224. The sixth side surface 392 is inclined and faces the fifth side surface 391.

The seventh side surface 393 faces the third sidewall 226 of the bottom chassis 200, and the eighth side surface 394 faces the fourth sidewall 228 of the bottom chassis 200.

The seventh side surface 393 maintains the first gap (G1) with the third sidewall 226 of the bottom chassis 200, and the eighth side surface 394 maintains the second gap (G2) with the fourth sidewall 228 of the bottom chassis 200.

A second stepped portion 397 is formed parallel to a sixth edge formed by the second upper surface 396 of the second optical sheet-fixing block 390 and the sixth side surface 392.

As shown in FIGS. 4A and 4B, fourth engaging holes 396a are formed on the second upper surface 396 of the second optical sheet-fixing block 390 so as to fix the second optical sheet-fixing block 390 to the bottom chassis 200. Second screws 396b are inserted into the corresponding fourth engaging holes 396a, and are inserted into the corresponding second engaging holes 212 of the bottom face 210 of the bottom chassis 200.

Figure 5A:
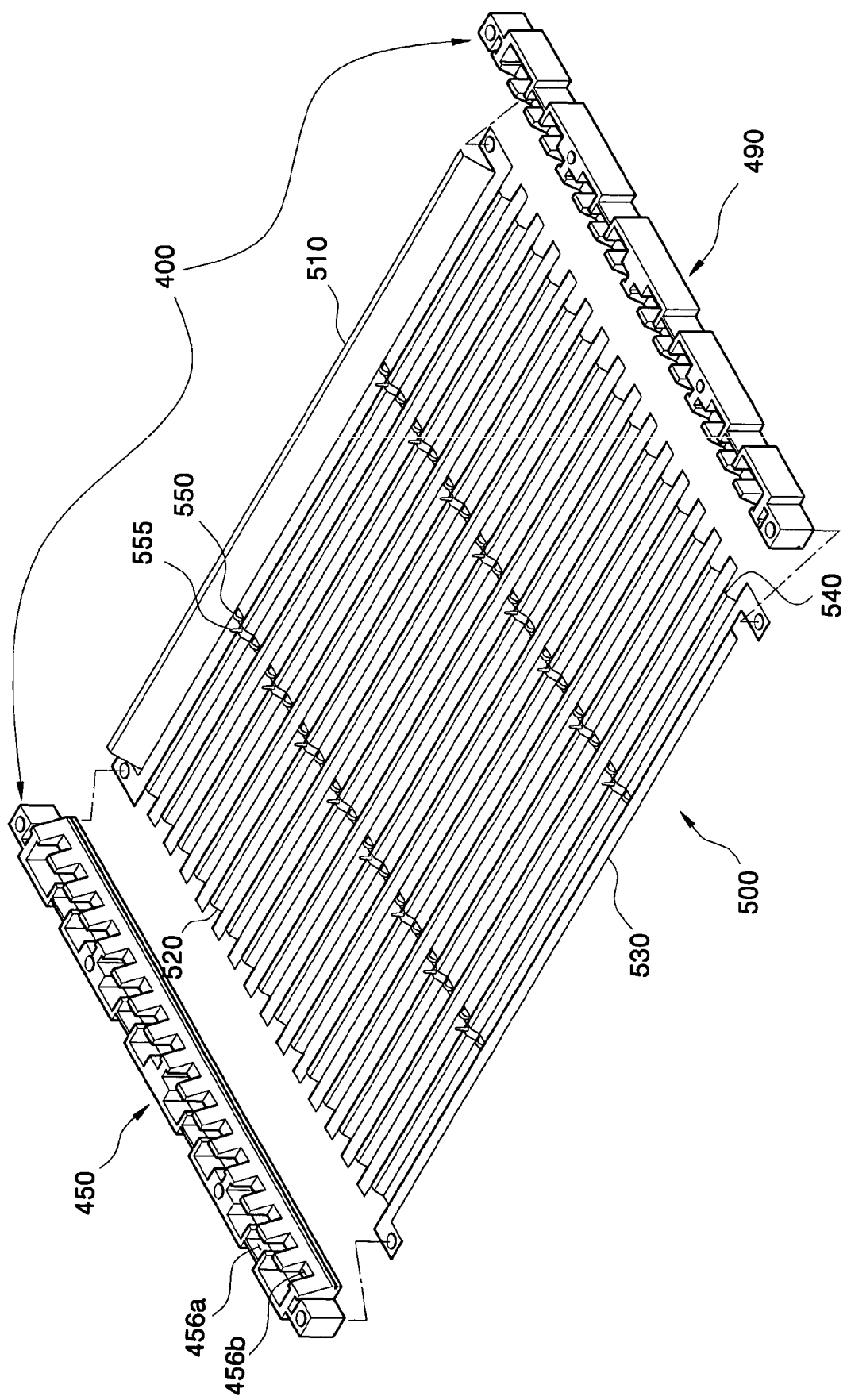
FIG. 5A is a perspective view showing a reflection plate and a lamp assembly-fixing block of the light-supplying module according to the second exemplary embodiment of the present invention.
Figure 5B:
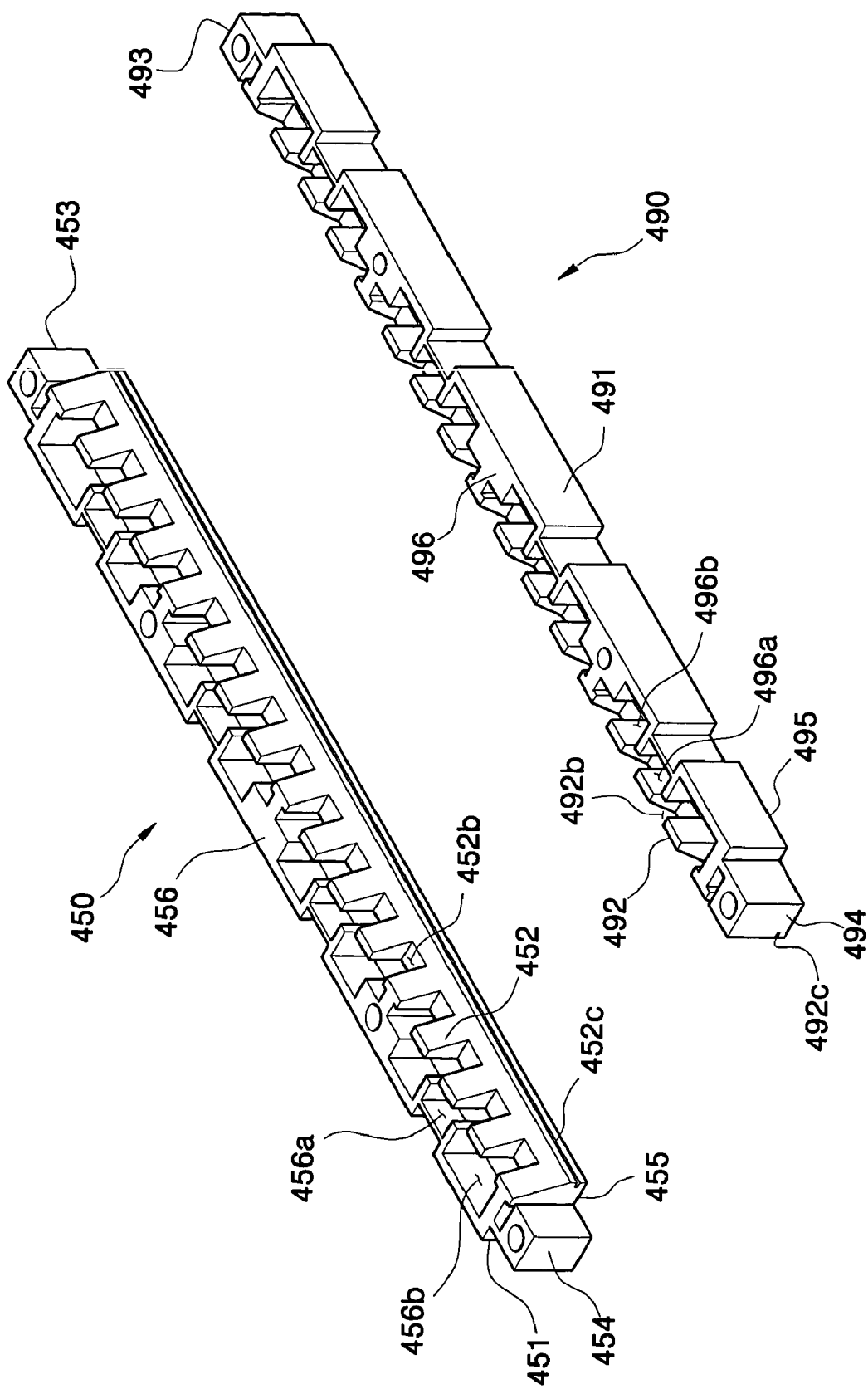
FIG. 5B is a perspective view showing the lamp assembly-fixing block of FIG. 5A.

FIG. 5A is a perspective view showing a reflection plate and a lamp assembly-fixing block of the light supplying module according to the second exemplary embodiment of the present invention, and FIG. 5B is a perspective view showing the lamp assembly-fixing block of FIG. 5A.

Referring to FIG. 5A, a lamp assembly-fixing block 400 is coupled to a reflection plate 500.

The lamp assembly-fixing block 400 includes a first lamp assembly-fixing block 450 and a second lamp assembly-fixing block 490.

Each of the first lamp assembly-fixing block 450 and the second lamp assembly-fixing block 490 has a rectangular parallelepiped shape.

Referring to FIG. 5B, the first lamp assembly-fixing block 450 includes a ninth side surface 451, a tenth side surface 452, an eleventh side surface 453, a twelfth side surface 454, a third bottom surface 455 and a third upper surface 456.

The ninth side surface 451 contacts tightly to the third sidewall 226 of the bottom chassis 200 (in FIG. 4A), the tenth side surface 452 faces the ninth side surface 451.

The eleventh side surface 453 contacts tightly to the first sidewall 222 of the bottom chassis 200, the twelfth side surface 454 contacts tightly to the second sidewall 224 of the bottom chassis 200.

The third bottom surface 455 contacts tightly to the bottom face 210 of the bottom chassis 200. The third upper surface 456 faces the third bottom surface 455.

The third upper surface 456 has first through-holes 456a and first grooves 456b. The first grooves 456b receive the first board 120 of the lamp assembly 100 (in FIG. 1).

The first connector 129 of the first board 120 is inserted into the first through-holes 456a.

The third bottom surface 455 is communicated with the third upper surface 456 by the first through-holes 456a such that the first terminal 144 is coupled to the first connector 129 (in FIG. 1).

The first grooves 456b are communicated with the first through-holes 456a, and are formed on the third upper surface 456 toward the third bottom surface 455 to have a predetermined depth.

The first grooves 456b receive the first board 120 having a high operating voltage and insulate the first board 120.

The number of the first grooves 456b is the same as the number of the first boards 120. Each of the first grooves 456b is formed with a predetermined interval on the third upper surface 456 to be separated physically each other.

A plurality of first openings 452b is formed on the tenth side surface 452 so that both the first board 120 and the lamp body 111 are inserted into the first grooves 456b.

A first slot 452c is formed on the tenth side surface 452 in parallel with the bottom face 210 of the bottom chassis 200 so that the reflection plate 500 is inserted into the tenth side surface 452.

Figure 6:
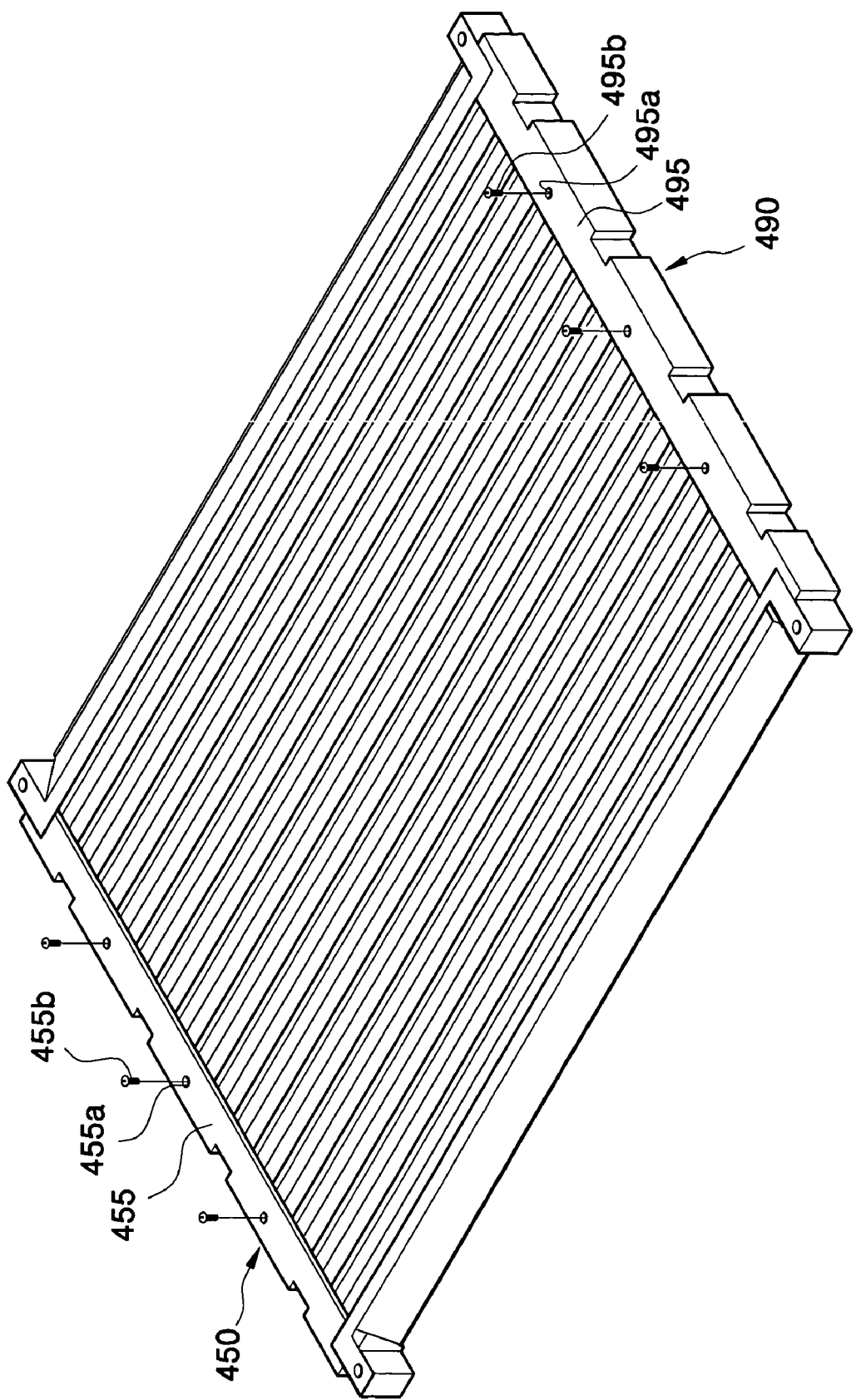
FIG. 6 is a perspective view showing a bottom surface of an assembled structure of the lamp assembly-fixing block and the reflection plate of FIG. 5A.

FIG. 6 is a perspective view showing the light showing a bottom surface of an assembled structure of the lamp assembly-fixing block and the light assembly of FIGS. 1 and 5A.

Referring to FIG. 6, the third bottom surface 455 of the first lamp assembly-fixing block 450 has a plurality of 10th engaging holes 455a.

Each of the tenth engaging holes 455a is formed on the third bottom surface 455 and corresponds to each of the fifth engaging holes 213 (in FIG. 4A), third screws 455b engage the tenth engaging holes 455a with the fifth engaging holes 213.

The second lamp assembly-fixing block 490 is formed in parallel to the fourth edge formed by the bottom face 210 of the bottom chassis 200 and the fourth sidewall 228.

Referring again to FIG. 5B, the second lamp assembly-fixing block 490 includes a thirteenth side surface 491, a fourteenth side surface 492, a fifteenth side surface 493, a sixteenth side surface 494, a fourth bottom surface 495 facing the bottom face 210 of the bottom chassis 200, and a fourth upper surface 496 facing the fourth bottom surface 495.

The thirteenth side surface 491 contacts tightly to the fourth sidewall 228 of the bottom chassis 200 (in FIG. 4A), the fourteenth side surface 492 faces the thirteenth side surface 491.

The fifteenth side surface 493 contacts tightly to the first sidewall 222 of the bottom chassis 200, the sixteenth side surface 494 contacts tightly to the second sidewall 224 of the bottom chassis 200.

The fourth upper surface 496 has second through-holes 496a and second grooves 496b. The second grooves 496b receive the second board 130 of the light assembly 100.

The second connector 139 of the second board 130 (in FIG. 1) is inserted into each of the second through-holes 496a. The fourth bottom surface 495 is communicated with the fourth upper surface 496 by the second through-holes 496a such that the second terminal 145 is coupled to the second connector 139 of the second board 130.

The second grooves 496b are communicated with the second through-holes 496a, and are formed on the fourth upper surface 496 toward the fourth bottom surface 495 to have a predetermined depth.

The second grooves 496b receive the second board 130 with a high operating voltage and insulate the second board 130.

The number of the second grooves 496b is the same as the number of the second boards 130. Each of the second grooves 496b is formed with a predetermined interval on the fourth upper surface 496 to be separated physically each other.

A plurality of second openings 492b is formed on the fourteenth side surface 492 so that both the third board 130 and the lamp body 111 are inserted into the first grooves 496b.

A second slot 492c is formed on the fourteenth side surface 492 in parallel with the bottom face 210 of the bottom chassis 200 so that the reflection plate 500 is inserted into the fourteenth side surface 492.

Referring again to FIG. 6, the fourth bottom surface 495 of the second lamp assembly-fixing block 490 has a plurality of eleventh engaging holes 495a.

Each of the eleventh engaging holes 495a is formed on the fourth bottom surface 495 and corresponds to each of the sixth engaging holes 214 (in FIG. 4A), fourth screws 495b engage the eleventh engaging holes 495a with the sixth engaging holes 214.

Referring again to FIG. 5A and FIG. 6, the reflection plate 500 has a seventh edge 510, an eighth edge 520, a ninth edge 530 and a tenth edge 540.

The seventh edge 510 is extended upward to the first stepped portion 357 along the second side surface 352 of the first optical sheet-fixing block 350 (in FIG. 4A).

The ninth edge 530 is opposite to the seventh edge 510, and is extended upward to the second stepped portion 397 along the sixth side surface 392 of the second optical sheet-fixing block 390 (in FIG. 4A).

The eighth edge 520 is inserted into the first slot 452c of the first lamp assembly-fixing block 450 to be fixed thereto, and the tenth edge 540 is inserted into the second slot 492c of the second lamp assembly-fixing block 490 to be fixed thereto.

The reference numeral 550 represents a lamp-fixing member for preventing each of the lamps 110 of the lamp assembly 100 from moving. The reference numeral 555 represents a projection formed at the lamp-fixing member 550 so as to prevent an optical sheet from being deflected.

Figure 7A:
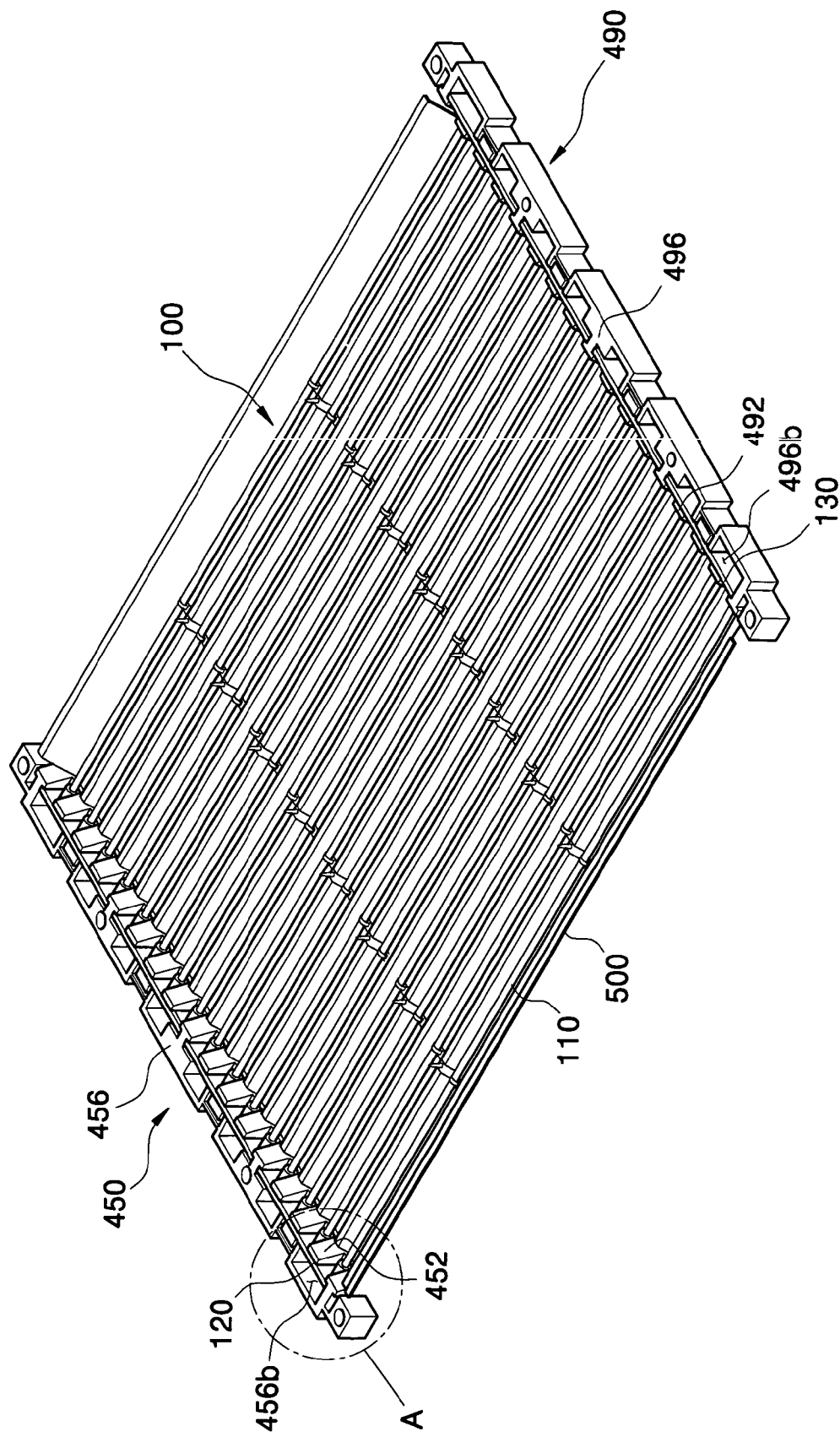
FIG. 7A is a perspective view showing an assembled structure of the reflection plate, the lamp assembly-fixing block and the light assembly according to the second exemplary embodiment of the present invention.
Figure 7B:
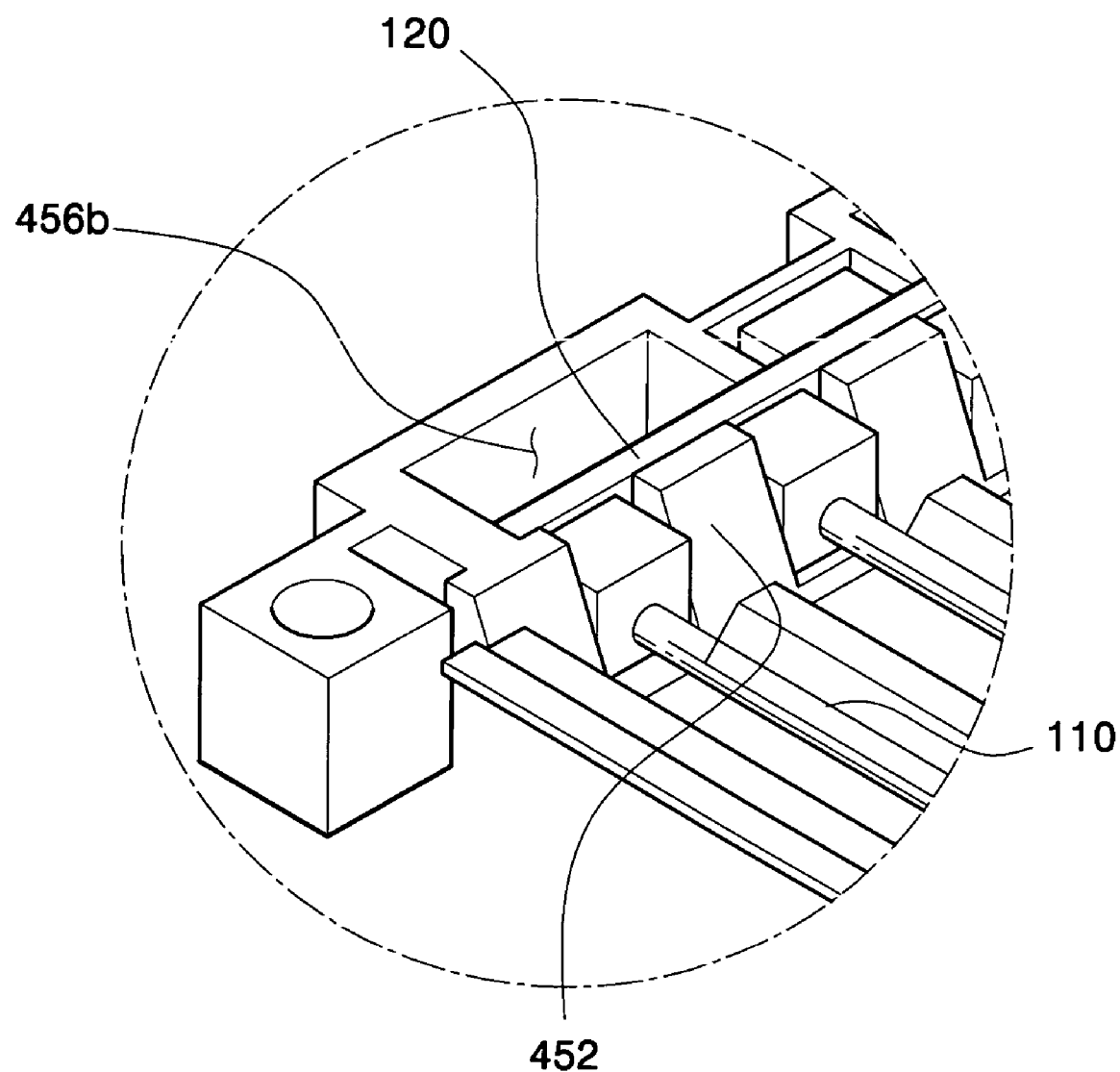
FIG. 7B is an enlarged view of 'A' in FIG. 7A.

FIG. 7A is a perspective view showing an assembled structure of the reflection plate 500, the lamp assembly-fixing block 400, and the lamp assembly 100 according to the second exemplary embodiment of the present invention. FIG. 7B is an enlarged view of 'A' in FIG. 7A.

Referring to FIG. 7A and FIG. 7B, the first board 120 is inserted into each of the first grooves 456b, and the second board 130 is inserted into each of the second grooves 456b.

Figure 9:
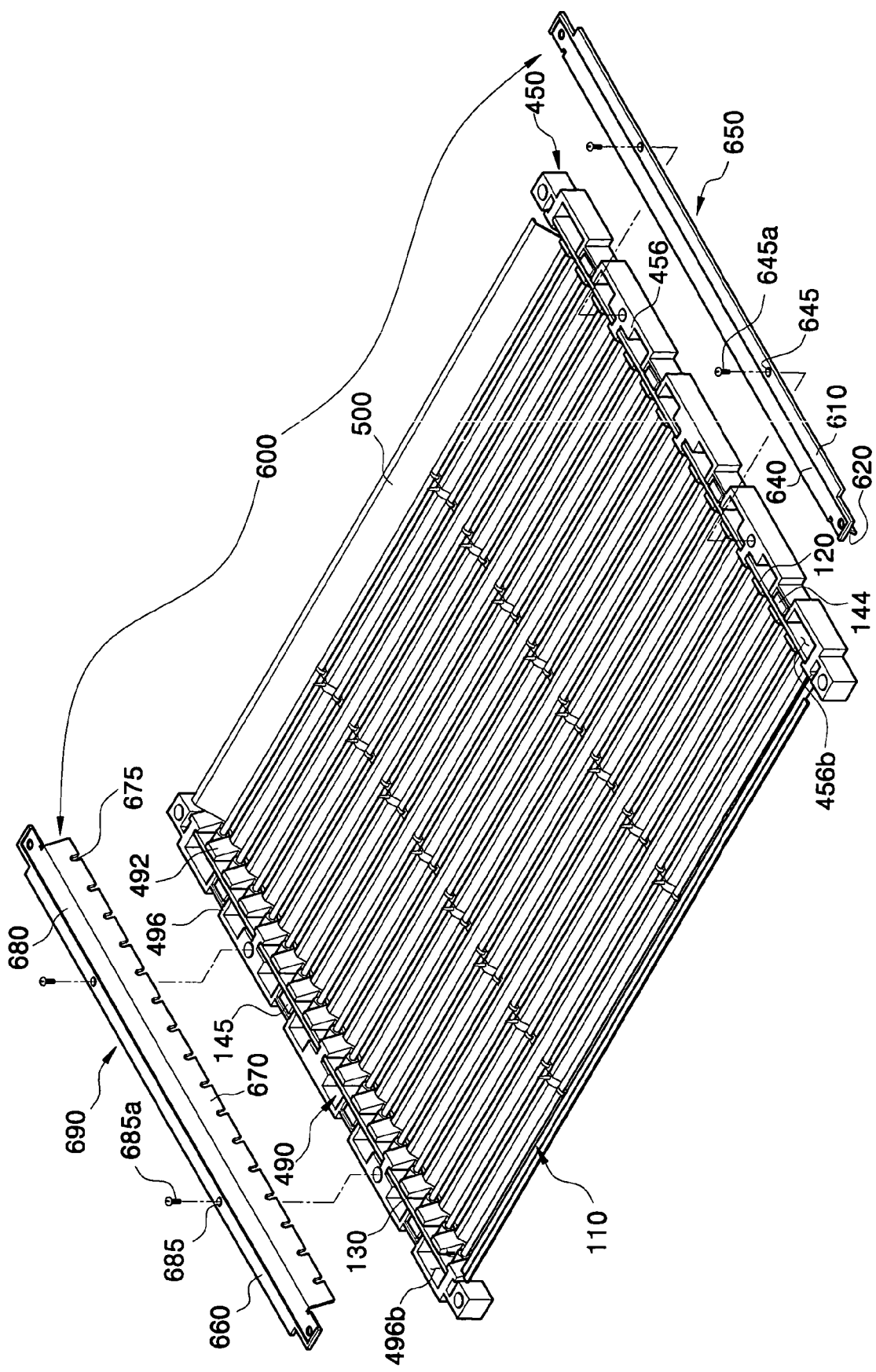
FIG. 9 is an exploded perspective view of FIG. 8.

FIG. 8 is a perspective view showing an assembled structure of an insulated frame, the reflection plate, the lamp assembly-fixing block, and the light assembly according to the second exemplary embodiment of the present invention, and FIG. 9 is an exploded perspective view of FIG. 8.

Referring to FIG. 8 and FIG. 9, an insulated frame 600 prevents the first and second boards 120 and 130 from being separated from the first and second grooves 456b and 496b, respectively. In addition, the insulated frame 600 insulates the first and second boards 120 and 130.

The insulated frame 600 includes a first insulated frame 650 and a second insulated frame 690.

As shown in FIGS. 8 and 9, the first insulated frame 650 includes a first frame body 610 and a seventeenth side surface 620.

The first frame body 610 covers the third upper surface 456 of the first lamp assembly-fixing block 450 (in FIG. 7A).

The seventeenth side surface 620 is extended from an edge of the first frame body 610, and is bent to cover the tenth side surface 452 of the first lamp assembly-fixing block 450.

The first frame body 610 has a third stepped portion 640 connected to the first stepped portion 357 of the first optical sheet-fixing block 350 (in FIG. 4B).

The first frame body 610 may have selectively twelfth engaging holes 645. The twelfth engaging holes 645 are engaged with the third upper surface 456 of the first lamp assembly-fixing block 450 by means of fifth screws 645a.

The seventeenth side surface 620 has third openings 630 so that the lamp body 111 of each of the lamps 110 is inserted into each of the third openings 630.

The second insulated frame 690 includes a second frame body 660 and an eighteenth side surface 670.

The second frame body 660 covers the fourth upper surface 496 of the second lamp assembly-fixing block 490.

The eighteenth side surface 670 is extended from an edge of the second frame body 660, and is bent to cover the fourteenth side surface 492 of the second lamp assembly-fixing block 490.

The second frame body 660 has a fourth stepped portion 680 connected to the second stepped portion 397 of the second optical sheet-fixing block 390 (in FIG. 4B).

The second frame body 660 may have selectively thirteenth engaging holes 685. The thirteenth engaging holes 685 are engaged with the fourth upper surface 496 of the second lamp assembly-fixing block 490 by means of sixth screws 685a.

The eighteenth side surface 670 has fourth openings 675 so that the lamp body 111 of each of the lamps 110 is inserted into each of the fourth openings 675.

Figure 10:
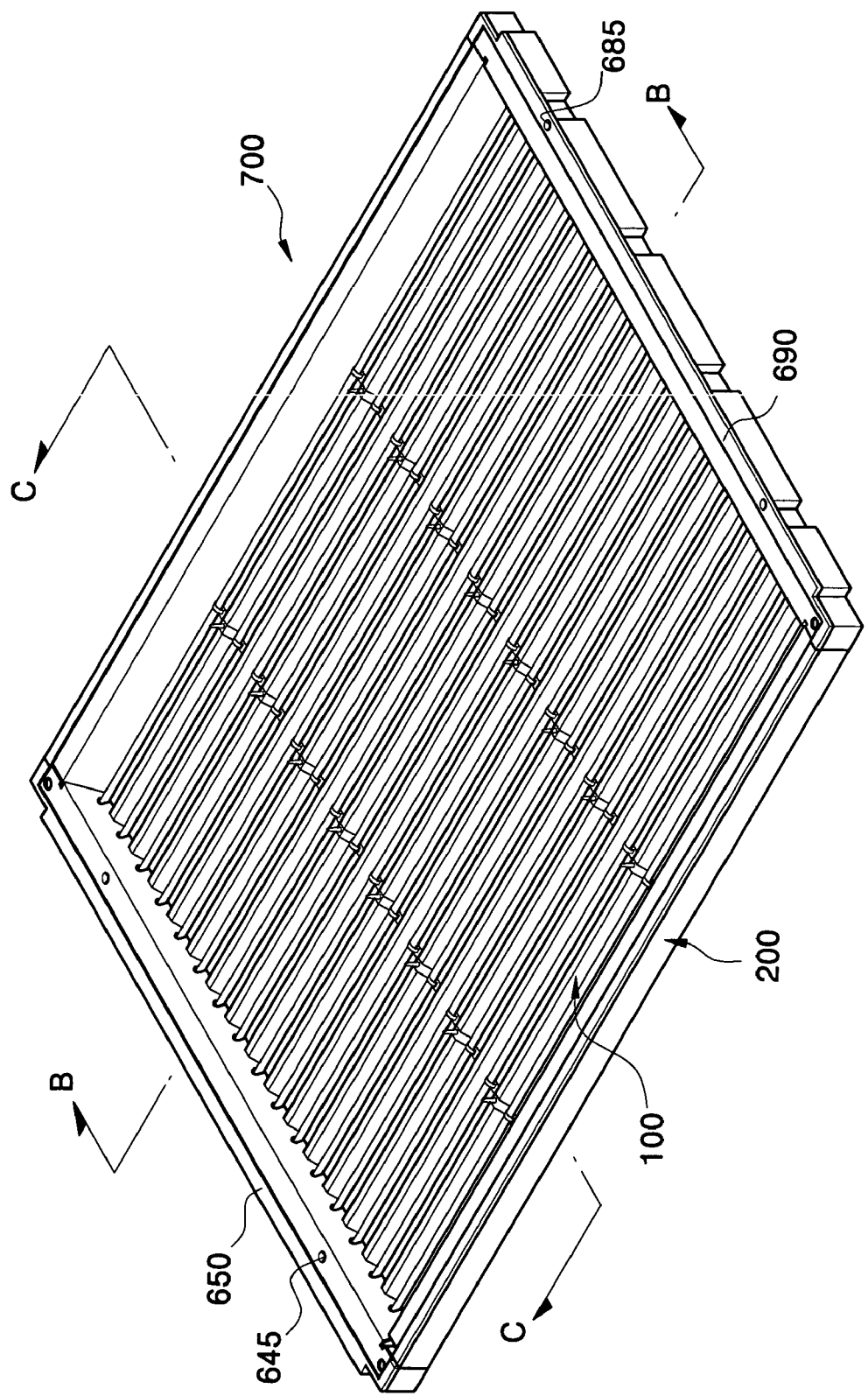
FIG. 10 is a perspective view showing the light-supplying module according to the second exemplary embodiment of the present invention.
Figure 11:
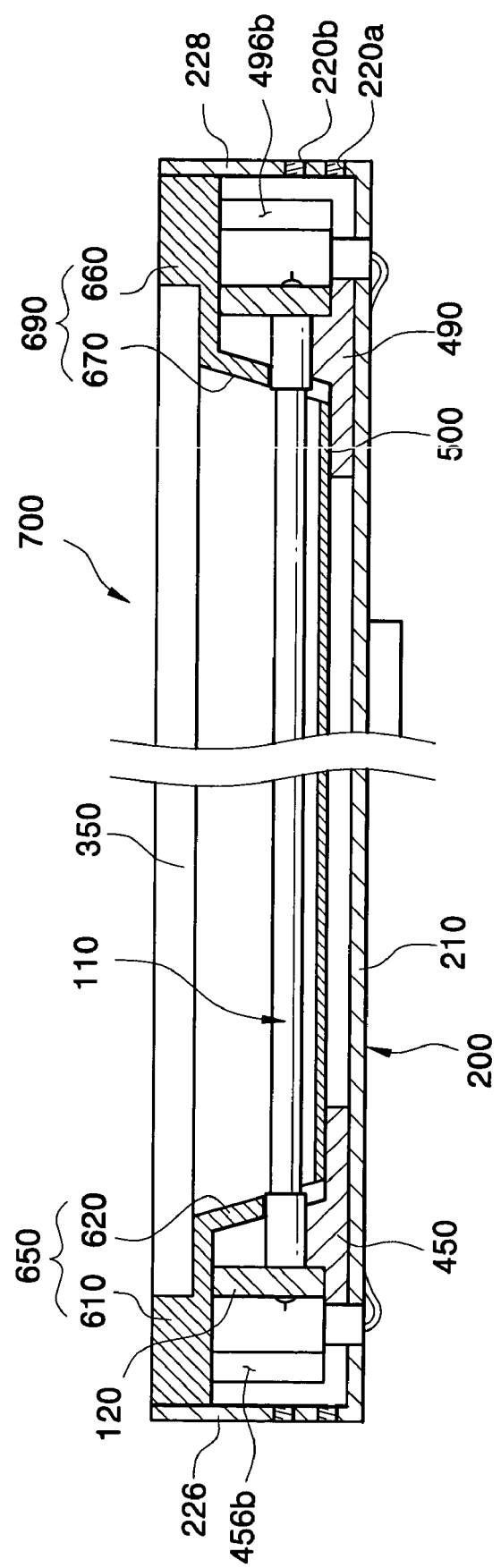
FIG. 11 is a cross-sectional view taken along B-B of FIG. 10.
Figure 12:
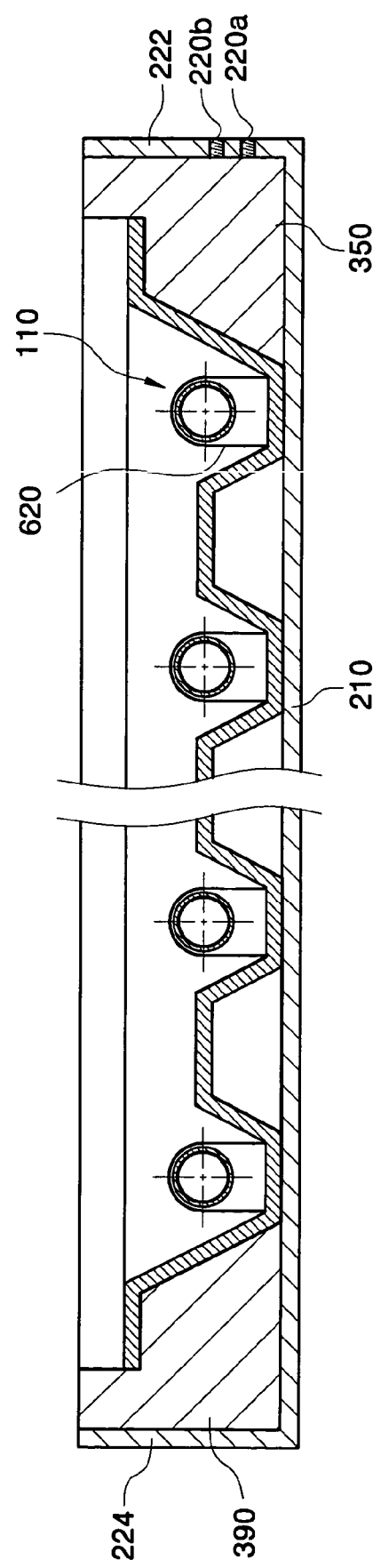
FIG. 12 is a cross-sectional view taken along C-C of FIG. 10.

FIG. 10 is a perspective view showing the light-supplying module according to the second exemplary embodiment of the present invention, FIG. 11 is a cross-sectional view taken along B-B of FIG. 10, and FIG. 12 is a cross-sectional view taken along C-C of FIG. 10.

Referring to FIG. 10, FIG. 11 and FIG. 12, the lamp assembly 100 is coupled to the first and second lamp assembly-fixing blocks 450 and 490. The first and second insulated frames 650 and 690 are coupled to the first and second lamp assembly-fixing blocks 450 and 490 by means of the twelfth engaging holes 645, the thirteenth engaging holes 685 and the fifth and sixth screws 645a and 685a. The combined structure of the lamp assembly 100, the first and second lamp assembly-fixing blocks 450 and 490, and the first and second insulated frames 650 and 690 are received in the receiving space of the bottom chassis 200, to thereby complete a light-supplying module 700.

Figure 13:
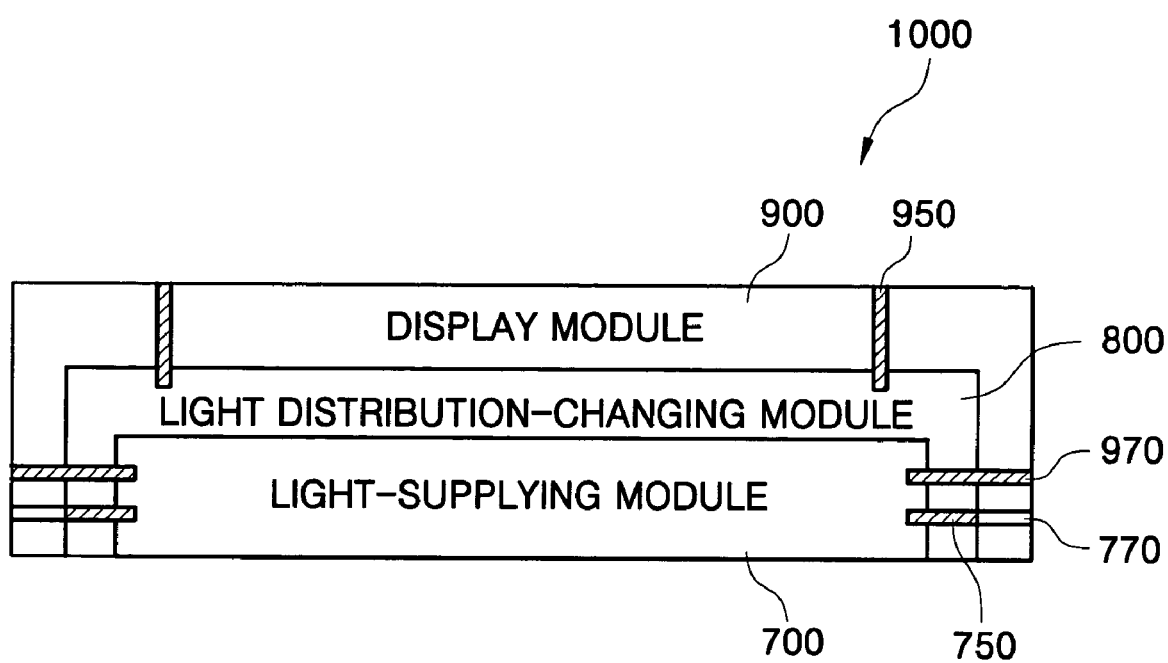
FIG. 13 is a schematic view showing a liquid crystal display device according to a third exemplary embodiment of the present invention.

FIG. 13 is a schematic view showing a liquid crystal display device according to a third exemplary embodiment of the present invention.

Referring to FIG. 13, a liquid crystal display device 1000 includes the light-supplying module 700, a light distribution-changing module 800, a first engaging member 750, a display module 900, a second engaging member 950 and a third engaging member 970.

The light-supplying module 700 generates a first light for displaying images.

The light distribution-changing module 800 receives the first light generated from the light-supplying module 700 and improves the optical characteristics of the first light to output a second light, to thereby improve display quality of the liquid crystal display device 1000.

The light distribution-changing module 800 is coupled to the light-supplying module 700 by means of the first engaging member 750.

The display module 900 receives the second light that has the improved optical characteristics, and changes the second light to a third light having image information.

The display module 900 is coupled to the light distribution-changing module 800 by means of the second engaging member 950.

The display module 900, the light distribution-changing module 800 and the light-supplying module 700 are coupled to each other by means of the third engaging member 970, to thereby complete the liquid crystal display device 1000.

Therefore, each component of the liquid crystal display device 1000 having above structure may be easily separated and replaced, and thus the device 1000 may be easily repaired.

Figure 14:
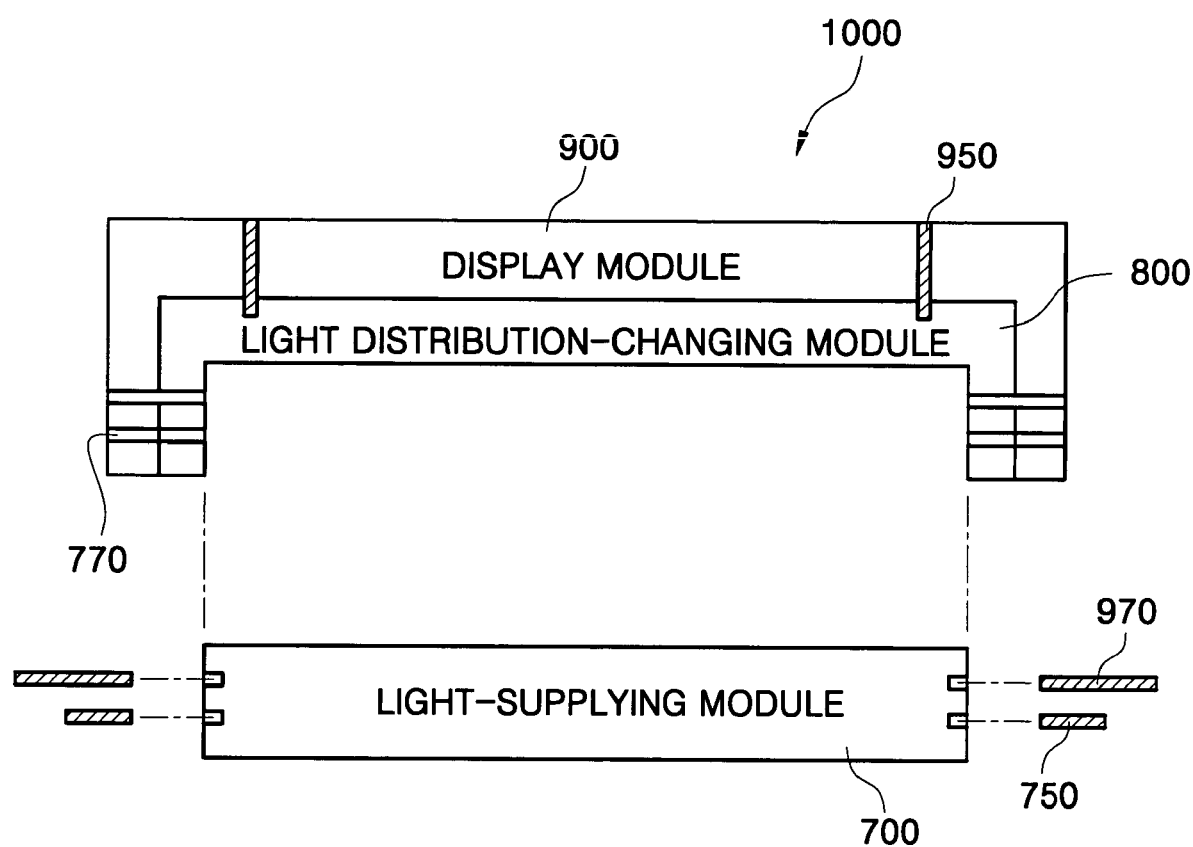
FIG. 14 is a schematic view showing the liquid crystal display device divided into a first part having the light-supplying module and a second part having the light distribution-changing module and the display module of FIG. 13.

FIG. 14 is a schematic view showing the liquid crystal display device divided into a first part having the light-supplying module and a second part having the light distribution-changing module and the display module of FIG. 13.

Referring to FIG. 14, the first engaging member 750 and the third engaging member 970 are disassembled from the liquid crystal display device 1000 such that the light-supplying module 700 is divided from the light distribution-changing module 800 and the display module 900. The display module 900 has fifth openings 770 through which the first engaging member 750 passes, thereby exposing the exterior of the liquid crystal display device 1000. Therefore, only the light-supplying module 700 may be divided from the liquid crystal display device 1000. Thus, the liquid crystal display device 1000 according to the present invention may easily replace an exhausted component, such as a lamp assembly and the like, with a new component.

Figure 15:
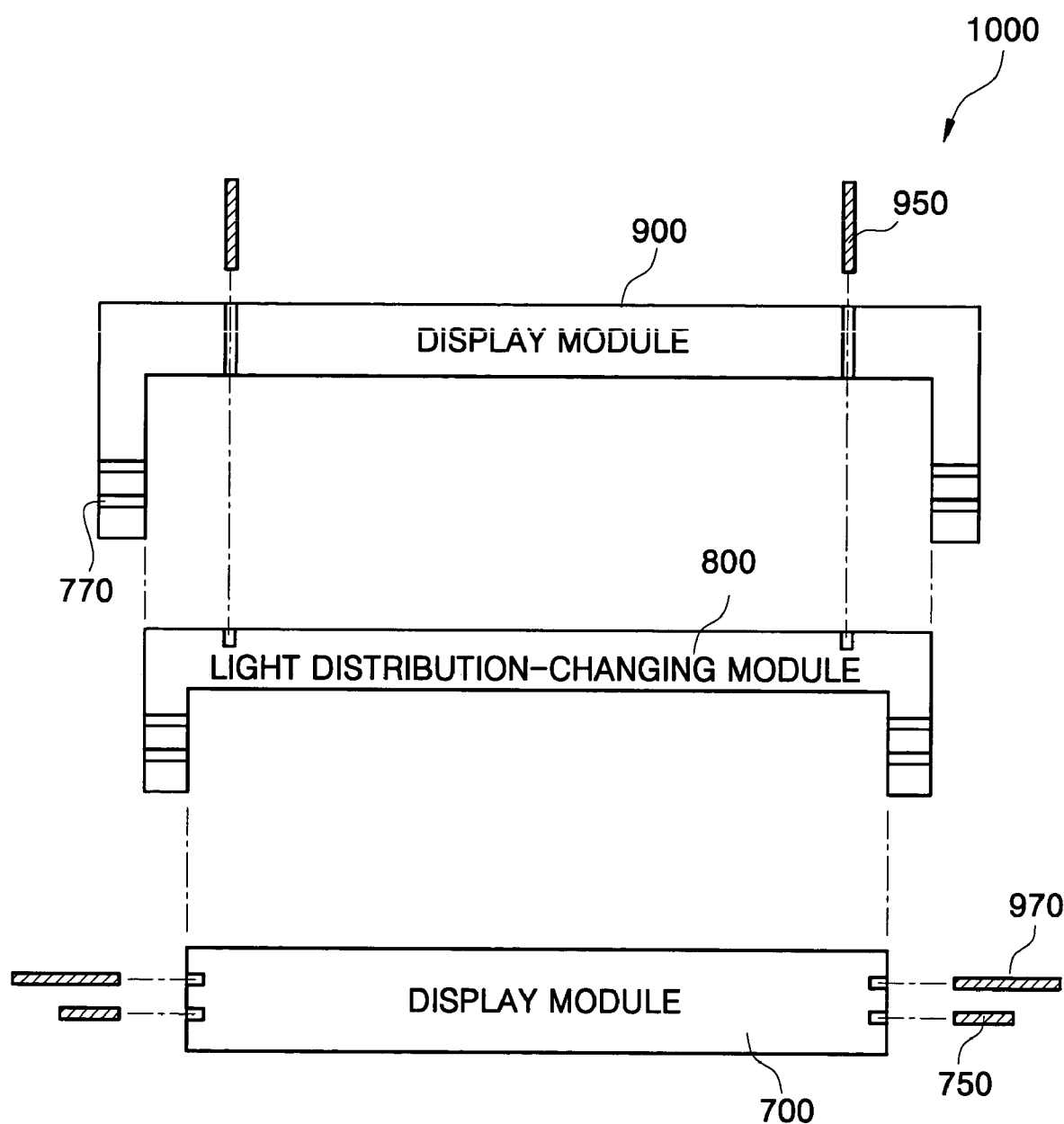
FIG. 15 is a schematic view showing the liquid crystal display device divided into the light-supplying module, the light distribution-changing module and the display module of FIG. 13.

FIG. 15 is a schematic view showing the liquid crystal display device 1000 divided into the light-supplying module, the light distribution-changing module and the display module of FIG. 13.

Referring to FIG. 15, the first engaging member 750, the second engaging member 950 and the third engaging member 970 are disassembled from the liquid crystal display device 1000 such that the light-supplying module 700, the light distribution-changing module 800 and the display module 900 are divided.

When the light-supplying module 700, the light distribution-changing module 800 and the display module 900 are divided, users may more easily disassemble and replace the components of the light-supplying module 700, such as the lamp assembly 100, the components of the light distribution-changing module 800, such as an optical sheet, and the components of the display module 900, such as an LCD panel.

Hereinafter, detailed descriptions about the lamp assembly and the light-supplying module will not be given because they are already explained in the first and second exemplary embodiments of the present invention.

Figure 16:
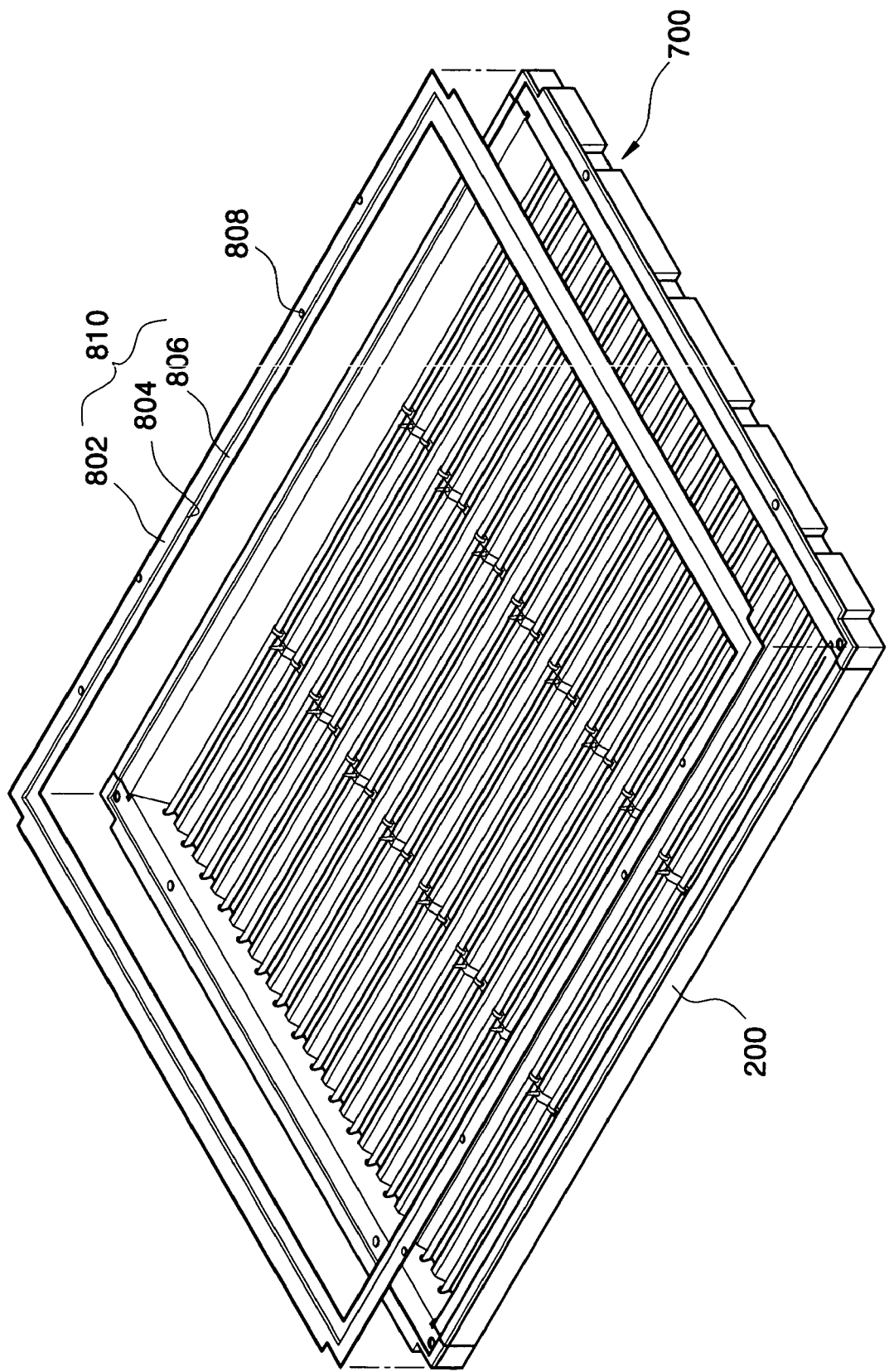
FIG. 16 is an exploded perspective view showing the light distribution-changing module of FIG. 13.
Figure 17:
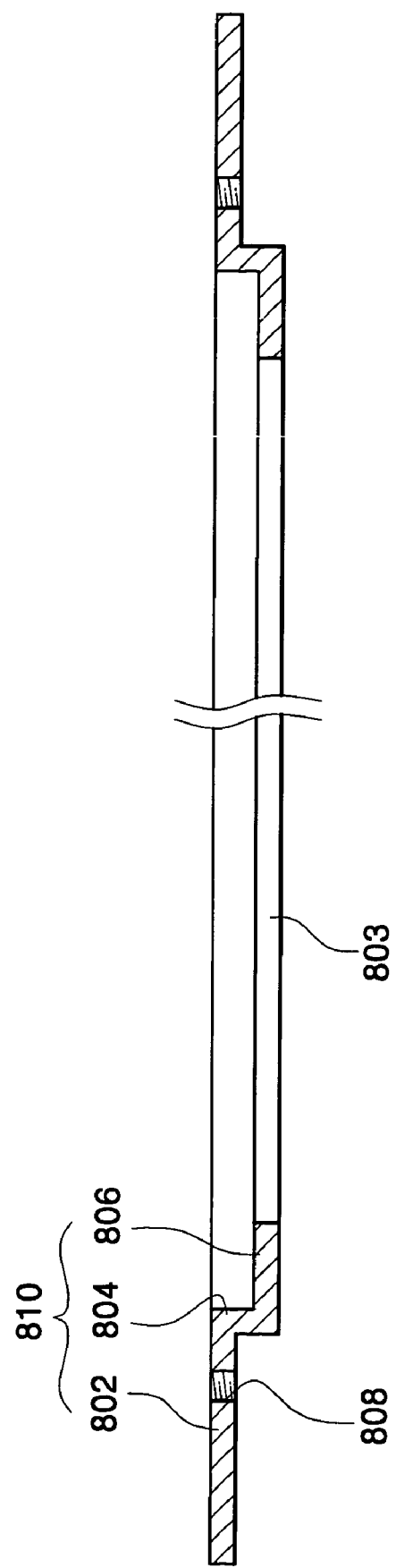
FIG. 17 is a cross-sectional view showing a first optical sheet-fixing chassis of FIG. 16.

FIG. 16 is an exploded perspective view showing the light distribution-changing module 800 of FIG. 13, FIG. 17 is a cross-sectional view showing a first optical sheet-fixing chassis of FIG. 16.

The light distribution changing module 800 includes first and second optical sheet-fixing chassis 810 and 830, and an optical sheet 820. Referring to FIG. 16 and FIG. 17, the first optical sheet-fixing chassis 810 includes a first chassis body 802, a second chassis body 804 and a third chassis body 806.

The third chassis body 806 has a frame shape having a sixth opening 803, and is disposed in parallel to the bottom face 210 of the bottom chassis 200.

The first chassis body 802 is mounted the first and second stepped portions 357 and 397 which are formed on the first and second upper surfaces 356 and 396 (in FIG. 4B), and the third and fourth stepped portions 640 and 680 which are formed on the first and second insulated frames 650 and 690 (in FIG. 8).

A plurality of fourteenth engaging holes 808 is formed with a predetermined interval on the first chassis body 802.

The second chassis body 804 is extended to the base of the first and second stepped portions 357 and 397 which are formed on the first and second upper surfaces 356 and 396, and the base of the third and fourth stepped portions 640 and 680 which are formed on the first and second insulated frames 650 and 690, along the inner surface of the first chassis body 802.

The third chassis body 806 is extended from the edge of the second chassis body 804, to bottom surfaces of the first and second stepped portions 357 and 397 and the bottom surfaces of the third and fourth stepped portions 640 and 680, to thereby be mounted the bottom surfaces of the first and second stepped portions 357 and 397 and the bottom surfaces of the third and fourth stepped portions 640 and 680.

Figure 18:
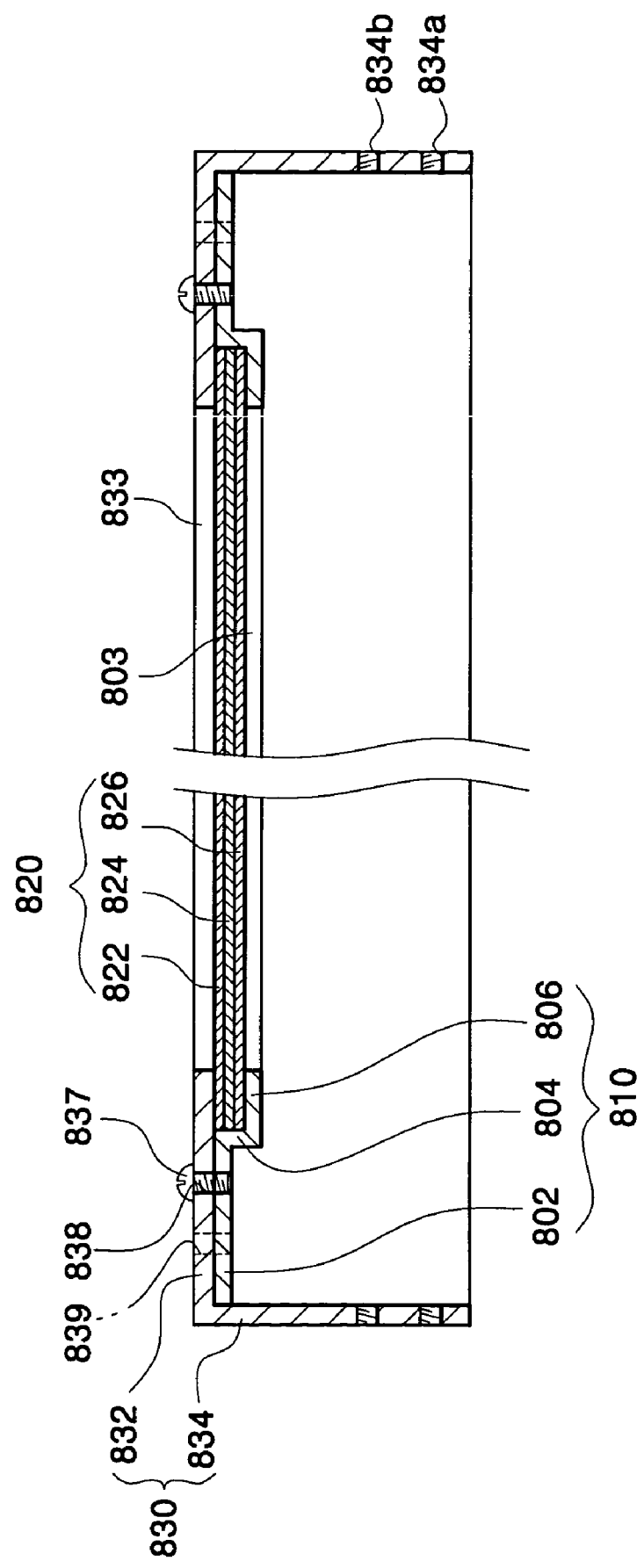
FIG. 18 is a cross-sectional view showing an assembled structure of the first optical sheet-fixing chassis, an optical sheet and a second optical sheet-fixing chassis according to the third exemplary embodiment of the present invention.
Figure 19:
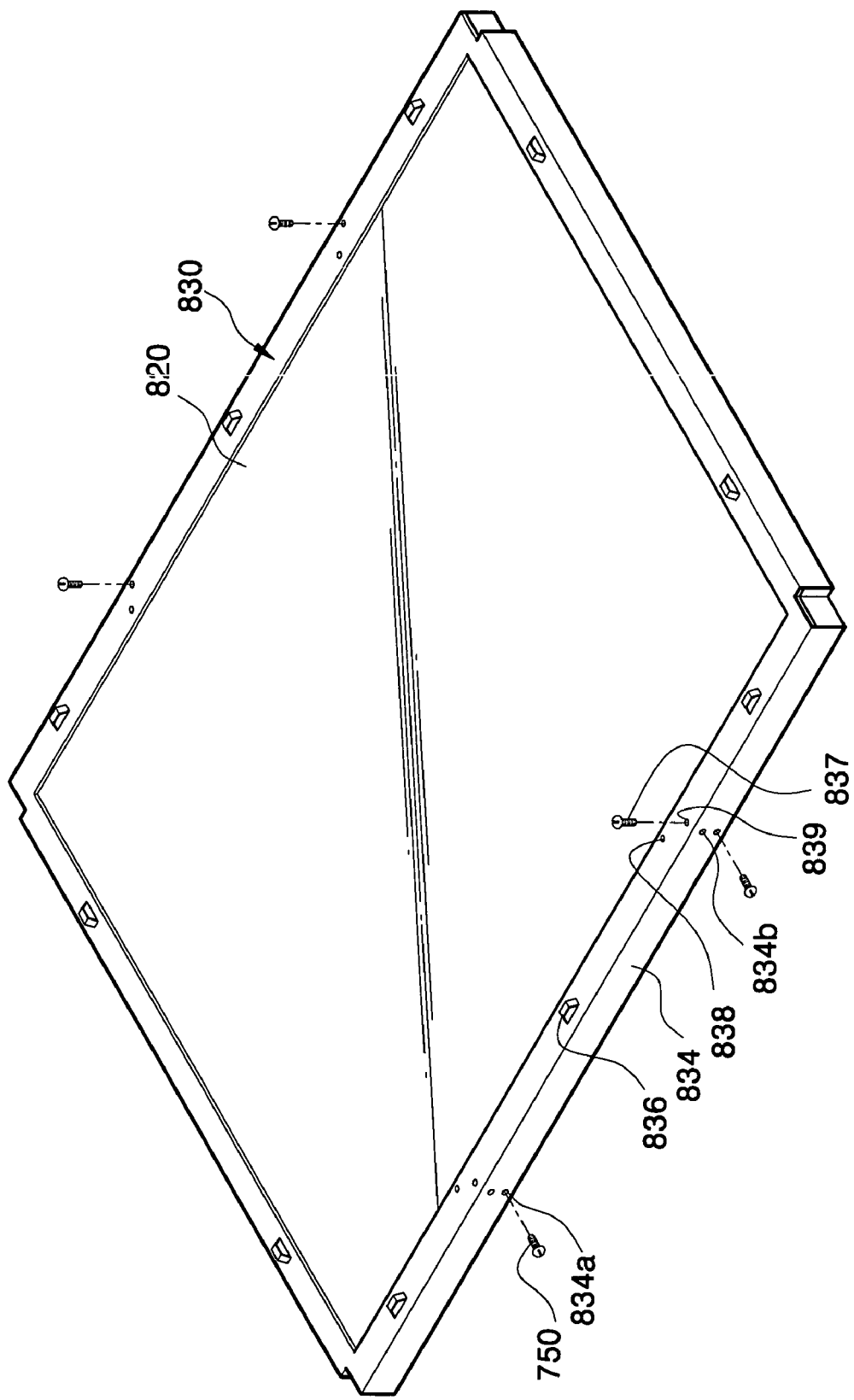
FIG. 19 is a perspective view showing the second optical sheet-fixing chassis of FIG. 18.

FIG. 18 is a cross-sectional view showing an assembled structure of the first optical sheet-fixing chassis, the optical sheet and the second optical sheet-fixing chassis according to the third exemplary embodiment of the present invention. FIG. 19 is a perspective view showing the second optical sheet-fixing chassis of FIG. 18.

Referring to FIG. 18, the optical sheet 820 is mounted on the third chassis body 806 of the first optical sheet-fixing chassis 810. The optical sheet 820 includes a prism sheet 822, such as a dual brightness enhancement film (DBEF), a diffusion sheet 824 and a diffusion plate 826.

Referring to FIG. 18 and FIG. 19, the second optical sheet-fixing chassis 830 includes a fourth chassis body 832 and a first chassis side surface 834.

The fourth chassis body 832 has a rectangular frame shape having a seventh opening 833 so as to cover the first chassis body 802 of the first optical sheet-fixing chassis 810.

The fourth chassis body 832 has a plurality of projections 836 for preventing an LCD panel from moving.

The fourth chassis body 832 has fifteenth engaging holes 838 so that the fourth chassis body 832 is combined with the first optical sheet-fixing chassis 810 by means of seventh screws 837.

In addition, the fourth chassis body 832 has sixteenth engaging holes 839 so as to be combined with a fixing member for fixing the liquid crystal display panel 1000.

The first chassis side surface 834 is extended in parallel to the first, second, third and fourth sidewalls 222, 224, 226 and 228 of the bottom chassis 200 from an edge of the fourth chassis body 832.

The first chassis side surface 834 has a plurality of seventeenth engaging holes 834a at a predetermined interval. A plurality of eighteenth engaging holes 834b is formed on an upper part of the seventeenth engaging holes 834a.

The first engaging member 750 is engaged with the seventeenth engaging holes 834a formed on the first chassis side surface 834, and the eighth engaging holes 220a formed on the first, second, third and fourth sidewalls of the bottom chassis 200.

Figure 20:
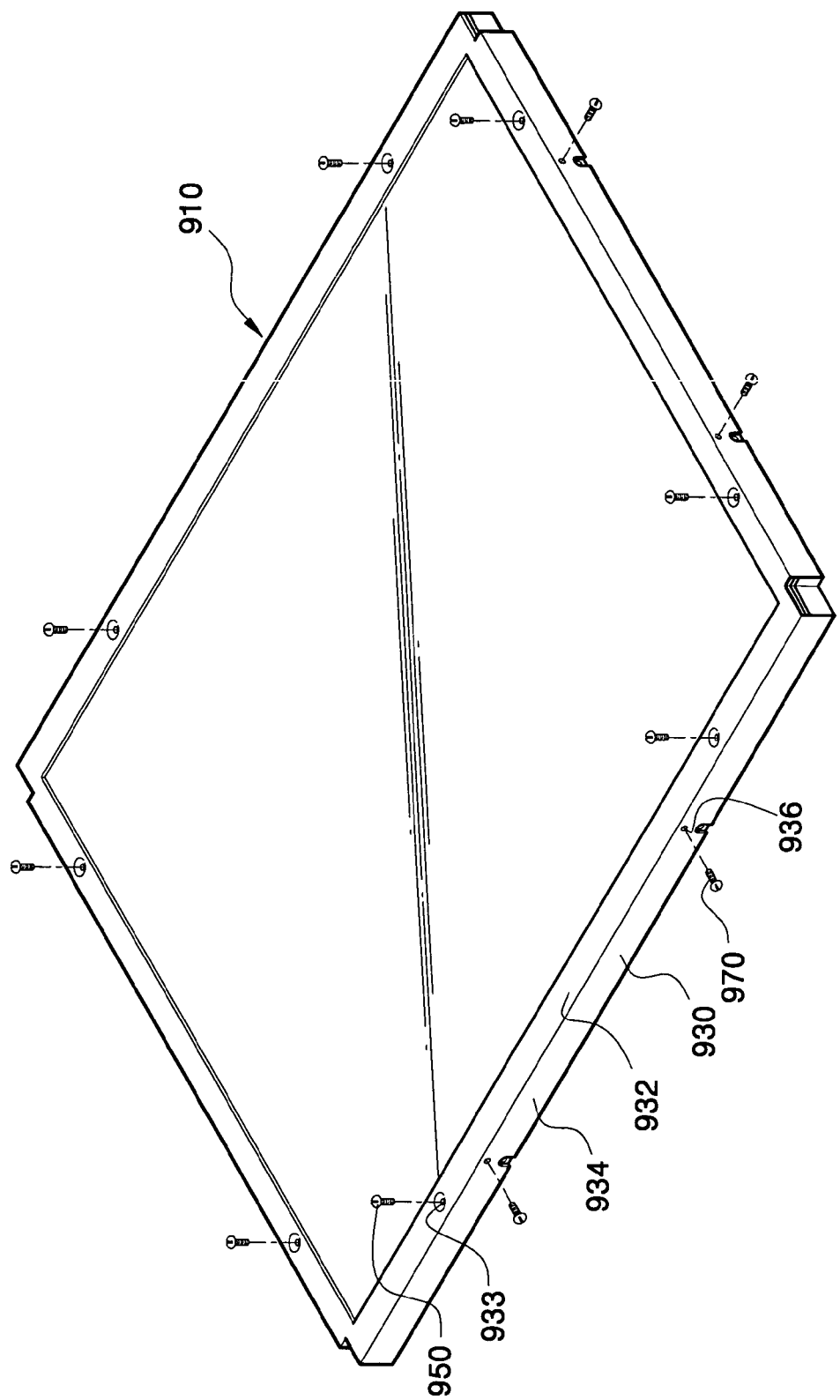
FIG. 20 is a perspective view showing an assembled structure of the light distribution-changing module and the display module according to the third exemplary embodiment of the present invention.
Figure 21:
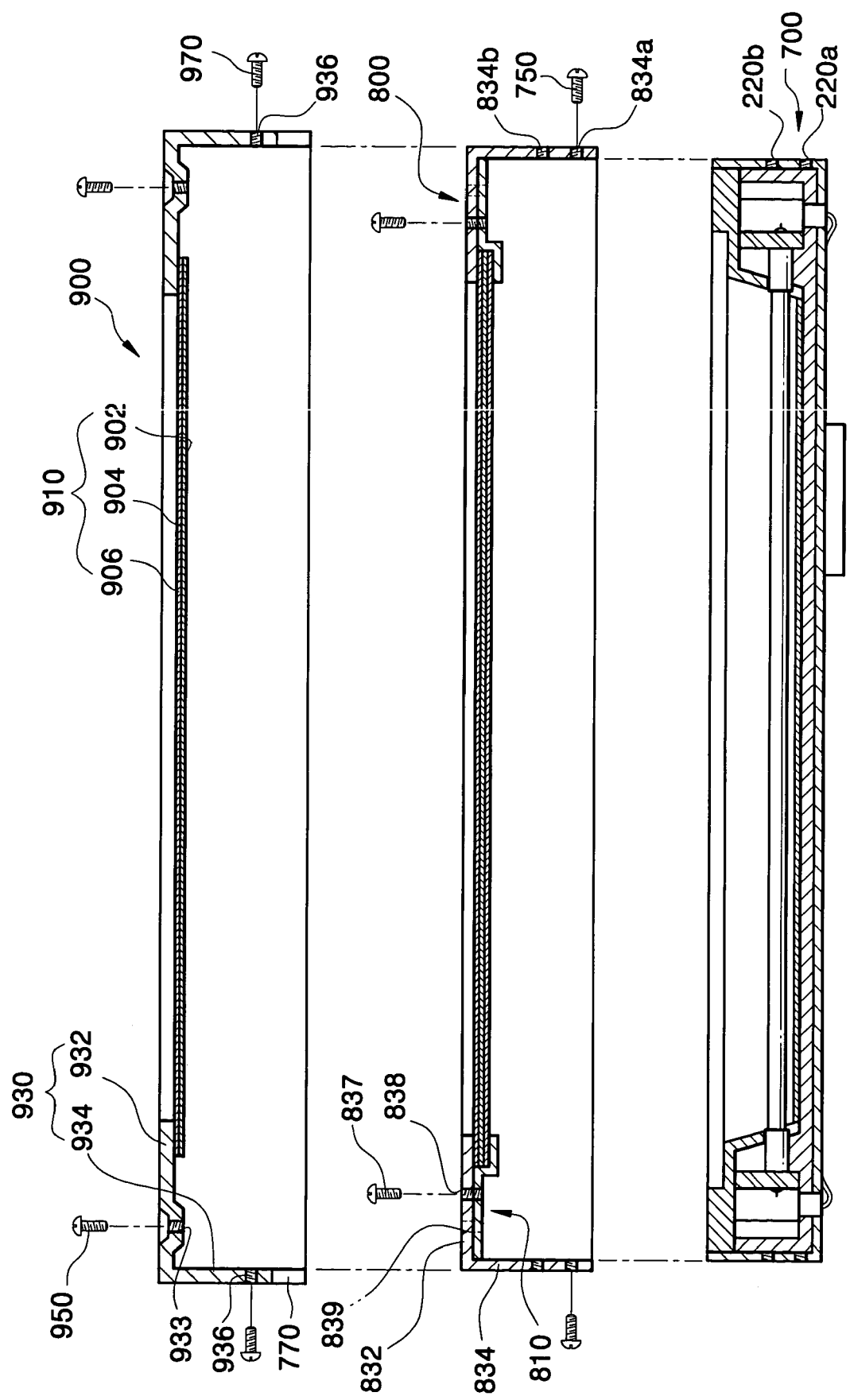
FIG. 21 is an exploded cross-sectional view showing the assembled structure of FIG. 20.

FIG. 20 is a perspective view showing an assembled structure of the light distribution-changing module and the display module according to the third exemplary embodiment of the present invention. FIG. 21 is an exploded cross-sectional view showing the assembled structure of FIG. 20.

Referring to FIG. 20 and FIG. 21, an LCD panel assembly 910 of the display module 900 includes a TFT substrate 906, liquid crystal 904, a color filter substrate 902 and a driver module (not shown).

The LCD panel assembly 910 according to the present invention is not confined to the structure shown in FIG. 20 and FIG. 21, and the structure and the driving method of the LCD panel assembly 910 may be varied.

As shown in FIG. 20, a fixing chassis 930 for fixing the liquid crystal display panel includes a fifth chassis body 932 and a second chassis side surface 934.

The fifth chassis body 932 has a rectangular frame shape having an inner edge and an outer edge, and presses edges of the LCD panel assembly 910 mounted on the fourth chassis body 832.

The fifth chassis body 932 has nineteenth engaging holes 933 so as to be combined with the fourth chassis body 832.

The second engaging member 950 is engaged with the nineteenth engaging holes 933 and the sixteenth engaging holes 839 formed on the fourth chassis body 832.

The second chassis side surface 934 is extended in parallel to the first, second, third and fourth sidewalls 222, 224, 226 and 228 of the bottom chassis 200 (in FIG. 4A) from the outer edge of the fifth chassis body 932.

The second chassis side surface 934 has twentieth engaging holes 936. The twentieth engaging holes 936 are engaged with the first, second, third, fourth sidewalls 222, 224, 226 and 228 of the bottom chassis 200 and the first chassis side surface 834.

The third engaging member 970 is engaged with the twentieth engaging holes 936 formed on the second chassis side surface 934, the ninth engaging holes 220b formed on the first, second, third, fourth sidewalls 222, 224, 226 and 228 of the bottom chassis 200, and the eighteenth engaging holes 834b formed on the first chassis side surface 834, to thereby complete the liquid crystal display device 1000.

This invention has been described with reference to the exemplary embodiments. It is evident, however, that many alternative modifications and variations will be apparent to those having skill in the art in light of the foregoing description. Accordingly, the present invention embraces all such alternative modifications and variations as fall within the spirit and scope of the appended claims.

What is claimed is:

1. A lamp assembly comprising:
at least two lamps, each of the lamps including:
a lamp body including a fluorescent layer formed on an inner surface of the lamp body and a discharge gas disposed in the lamp body;
a first electrode for providing the lamp body with a first discharge voltage; and
a second electrode for providing the lamp body with a second discharge voltage;
a first lamp holder having a pipe-shape, a first end portion of the lamp being inserted into the pipe-shape to be fastened to the first lamp holder;
a first board having a flat plate shape and being coupled to first electrodes of the lamps to provide the first electrodes with the first discharge voltage, the first board including:
a first insulated body having a first inward surface that makes contact with the first lamp holder and a first outward surface that is opposite to the first inward surface;
a first conductive pattern formed on the first outward surface of the first insulated body; and
at least two first through-holes formed on the first insulated body and each of the first through-holes receiving the first electrode of each of the lamps, the first electrode extending through the first through-hole to the first outward surface of the first insulated body and being electrically connected to the first conductive pattern;
a first connector installed on the first board to electrically connect the first electrodes that are coupled to the first board to an inverter that generates the first discharge voltage, the first connector being disposed between the at least two first through-holes; and
a first terminal removably coupled to the first connector to receive the first discharge voltage from the inverter and provide the first discharge voltage to the first connector, the first terminal is configured to facilitate disassembly and reassembly with a coupling portion of the first connector to provide electrical connection therebetween.

2. The lamp assembly of claim 1, wherein the first connector is installed on the first conductive pattern of the first board, and electrically connects the first conductive pattern of the first board to the inverter through the first terminal.

3. The lamp assembly of claim 1, wherein the first electrode is soldered with the first conductive pattern to be electrically connected thereto.

4. The lamp assembly of claim 1, wherein the first lamp holder comprises rubber.

5. The lamp assembly of claim 1, further comprising:
a second lamp holder having a pipe-shape, a second end portion of the lamp being inserted into the pipe-shape to be fastened to the second lamp holder; and
a second board coupled to the second electrode to provide the second electrode with the second discharge voltage.

6. The lamp assembly of claim 5, wherein the second board includes:
a second insulated body having a second inward surface that makes contact with the second lamp holder and a second outward surface that is opposite to the second inward surface;
a second conductive pattern formed on the second outward surface of the second insulated body; and
at least two second through-holes formed on the second insulated body, the second electrode extending through the second through-hole to the second outward surface of the second insulated body and being electrically connected to the second conductive pattern.

7. The lamp assembly of claim 6, further comprising:
a second connector installed on the second conductive pattern; and
a second terminal, coupled to the second connector to receive the second discharge voltage from the inverter and provide the second discharge voltage to the second connector.

8. The lamp assembly of claim 7, wherein the second connector electrically connects the second conductive pattern of the second board to the inverter through the second terminal.

9. The lamp assembly of claim 6, wherein the second electrode is soldered with the second conductive pattern to be electrically connected thereto.

10. The lamp assembly of claim 5, wherein the second lamp holder comprising rubber.

11. The lamp assembly of claim 1, wherein the number of the lamps is four.

12. The lamp assembly of claim 1, wherein the first board is disposed such that a major planar surface of the first board is substantially perpendicular to a longitudinal direction of each of the lamps.

13. The lamp assembly of claim 1, wherein the first board is intermediate the first lamp holder and a terminal end of the first electrode.

14. The lamp assembly of claim 1, wherein the first connector has the coupling portion formed at a lower portion of the first connector.

15. A lamp assembly comprising:
at least two lamps, each of the lamps including:
a lamp body including a fluorescent layer formed on an inner surface of the lamp body and a discharge gas disposed in the lamp body;
a first electrode for providing the lamp body with a first discharge voltage; and
a second electrode for providing the lamp body with a second discharge voltage;
a first lamp holder having a pipe-shape, a first end portion of the lamp being inserted into the pipe-shape to be fastened to the first lamp holder;
a first board that makes contact with the first lamp holder and is electrically coupled to first electrodes of the lamps such that the first end portion of the lamp body is spaced apart from the first board, the first board including:
an insulated body having an inward surface that makes contact with the first lamp holder and an outward surface that is opposite to the inward surface;
at least one conductive pattern formed on the outward surface of the insulated body and electrically connected to the first electrode of each of the lamps; and
at least two through-holes formed on the insulated body and each of the through-holes receiving the first electrode of each of the lamps, the first electrodes extending through the through-holes to the outward surface of the first insulated body and being electrically connected to the conductive pattern;
a connector installed on the conductive pattern to electrically connect the first electrodes that are coupled to the first board to an inverter that generates the first discharge voltage, the connector being disposed between the at least two first through-holes; and
a first terminal removably coupled to the connector to receive the first discharge voltage from the inverter and provide the first discharge voltage to the connector, the first terminal is configured to facilitate disassembly and reassembly with a coupling portion of the connector to provide electrical connection therebetween.

16. The lamp assembly of claim 15, wherein the connector electrically connects the conductive pattern of the first board to the inverter through the terminal.

17. The lamp assembly of claim 15, wherein the first electrode is soldered with the conductive pattern to be electrically connected thereto.

18. The lamp assembly of claim 15, wherein the first lamp holder comprises rubber.

19. The lamp assembly of claim 15, further comprising a second lamp holder to the second electrode to provide the second electrode with the second discharge voltage and a second board coupled to the second electrode, wherein the second board and the second lamp holder have identical shapes with the first board and the first lamp holder, respectively.

20. The lamp assembly of claim 15, wherein the connector has the coupling portion formed at a lower portion of the connector.

* * * * *